US011829498B2

(12) United States Patent
Mamadapur et al.

(10) Patent No.: US 11,829,498 B2
(45) Date of Patent: Nov. 28, 2023

(54) REAL-TIME DYNAMIC BLOCKCHAIN SECURITIZATION PLATFORM

(71) Applicant: Bank of America Corporation, Charlotte, NC (US)

(72) Inventors: Krishna Rangarao Mamadapur, Maharashtra (IN); Jigesh Rajendra Safary, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 17/405,405

(22) Filed: Aug. 18, 2021

(65) Prior Publication Data

US 2023/0056885 A1 Feb. 23, 2023

(51) Int. Cl.
*G06F 21/62* (2013.01)
*G06F 21/60* (2013.01)
*G06F 21/76* (2013.01)
*G06F 21/31* (2013.01)

(52) U.S. Cl.
CPC .......... *G06F 21/6209* (2013.01); *G06F 21/31* (2013.01); *G06F 21/602* (2013.01); *G06F 21/604* (2013.01); *G06F 21/76* (2013.01)

(58) Field of Classification Search
CPC .... G06F 21/6209; G06F 21/31; G06F 21/602; G06F 21/604; G06F 21/76
See application file for complete search history.

(56) References Cited

U.S. PATENT DOCUMENTS

| 7,010,681 | B1 * | 3/2006 | Fletcher | H04L 63/0428 |
| | | | | 713/154 |
| 8,266,245 | B1 * | 9/2012 | Saviano | G06Q 10/10 |
| | | | | 726/4 |
| 9,292,703 | B2 * | 3/2016 | Brochard | G06F 21/10 |
| 10,382,205 | B1 | 8/2019 | Ko | |
| 10,387,684 | B2 | 8/2019 | Carey et al. | |
| 10,542,046 | B2 | 1/2020 | Katragadda et al. | |
| 10,915,716 | B2 | 2/2021 | Levy et al. | |
| 11,042,804 | B2 | 6/2021 | Kikinis | |
| 2003/0120949 | A1 * | 6/2003 | Redlich | C07K 14/70575 |
| | | | | 726/21 |
| 2010/0070396 | A1 * | 3/2010 | Schrichte | G06F 21/62 |
| | | | | 705/344 |
| 2013/0290856 | A1 * | 10/2013 | Beveridge | G06F 3/1454 |
| | | | | 715/740 |

(Continued)

*Primary Examiner* — Vance M Little
(74) *Attorney, Agent, or Firm* — Banner & Witcoff, Ltd.

(57) ABSTRACT

Aspects of the disclosure relate to real-time dynamic securitization of blockchain records. A computing platform may receive record retrieval data comprising record data identifying one or more requested records. The computing platform may decrypt the first requested record to generate a decrypted requested record. The computing platform may parse the decrypted requested record to generate parsed record data. The computing platform may determine that the parsed record data comprises a subset of predetermined textual content. The computing platform may mark one or more predetermined textual content of the subset of predetermined textual content for securitization. The computing platform may generate a securitized record by redacting, from the decrypted requested record, each of the one or more predetermined textual content marked for securitization.

20 Claims, 17 Drawing Sheets

(56) References Cited

U.S. PATENT DOCUMENTS

| | | | |
|---|---|---|---|
| 2015/0046706 A1* | 2/2015 | Makarov | G06F 21/6218 |
| | | | 713/165 |
| 2016/0248752 A1* | 8/2016 | Blinn | H04L 63/083 |
| 2019/0273739 A1 | 9/2019 | Pemmaraju | |
| 2020/0035339 A1 | 1/2020 | Eevani et al. | |
| 2020/0099512 A1 | 3/2020 | Kikinis | |
| 2020/0372154 A1 | 11/2020 | Bacher et al. | |
| 2021/0029163 A1 | 1/2021 | Behl et al. | |

* cited by examiner

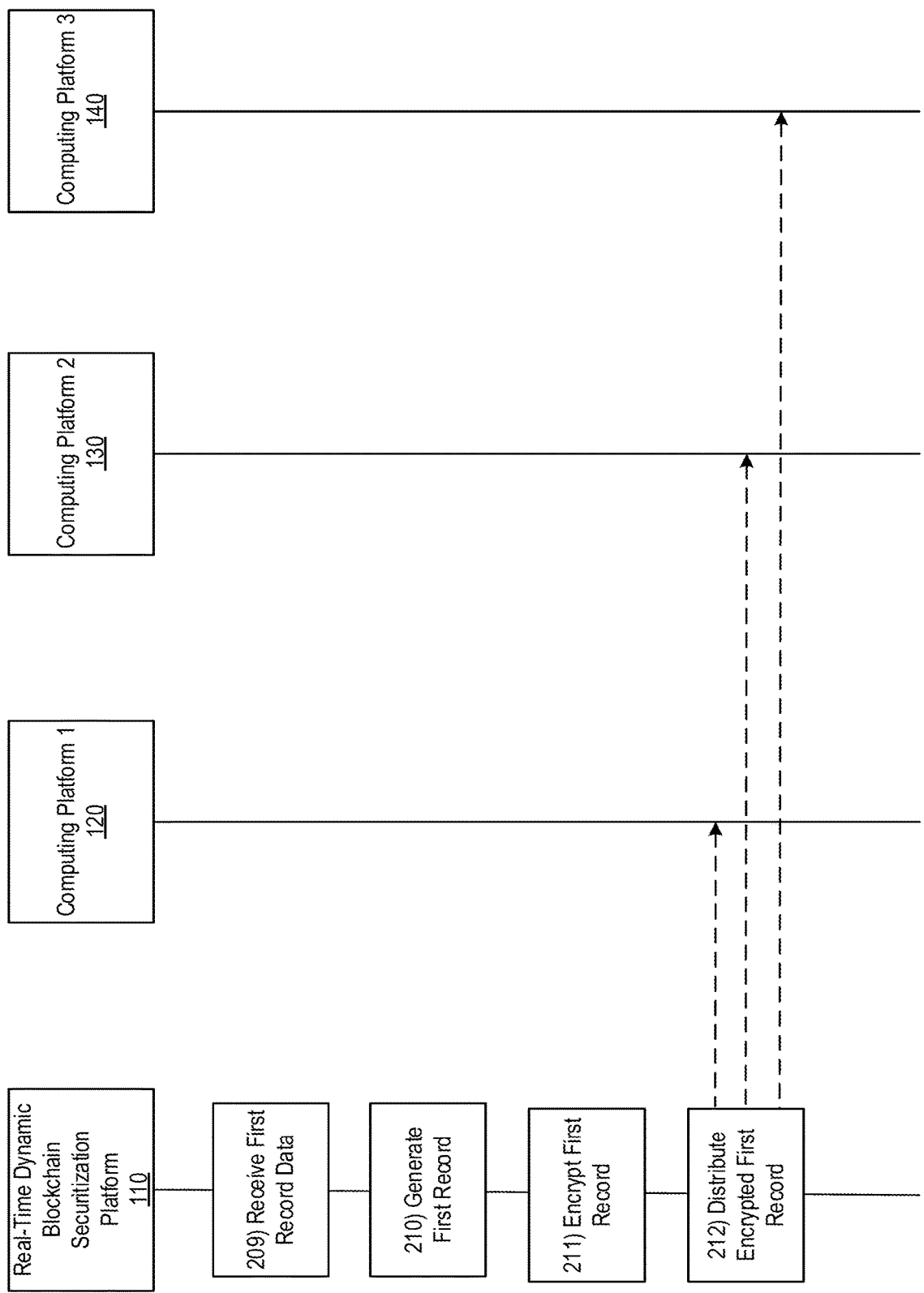

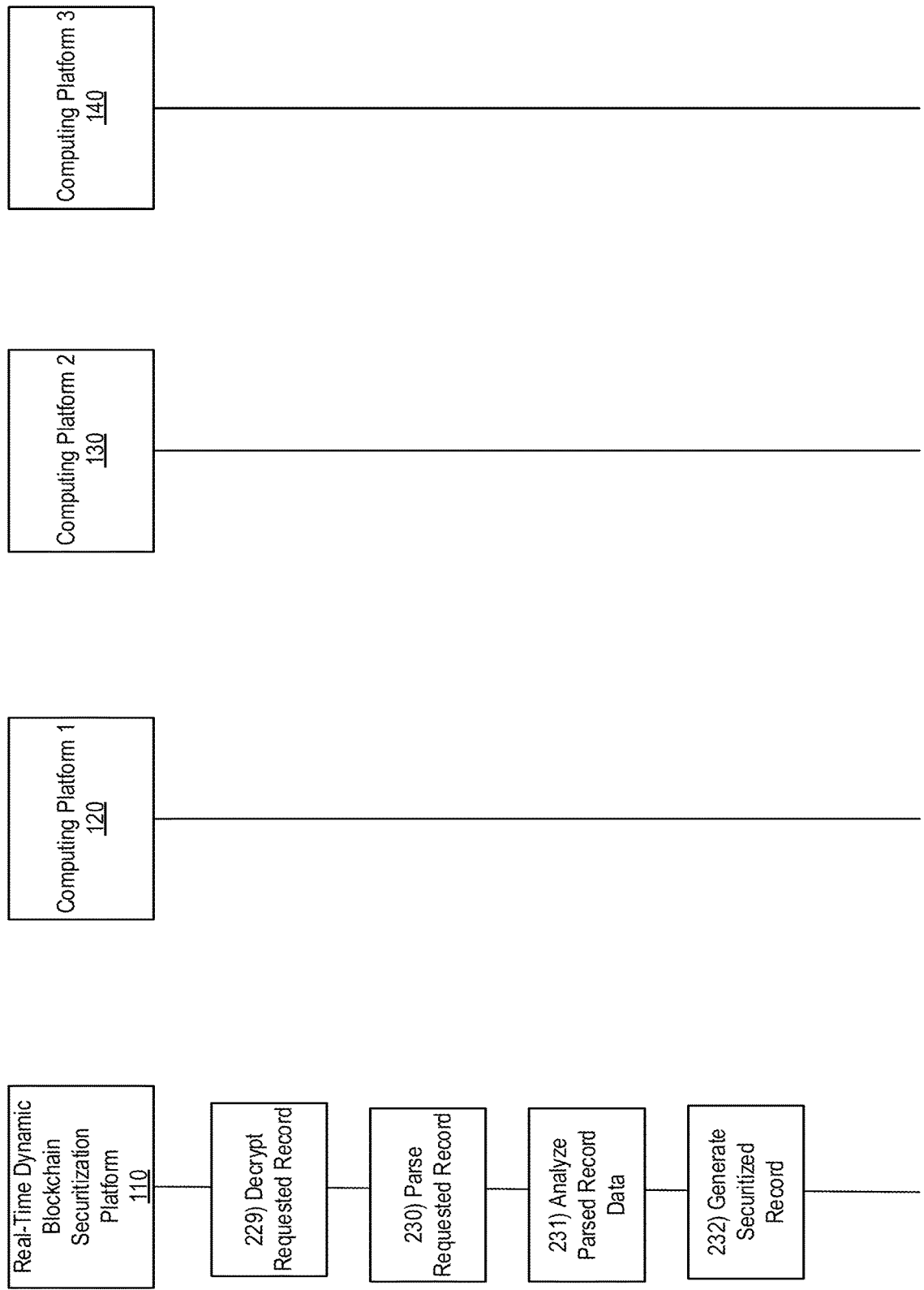

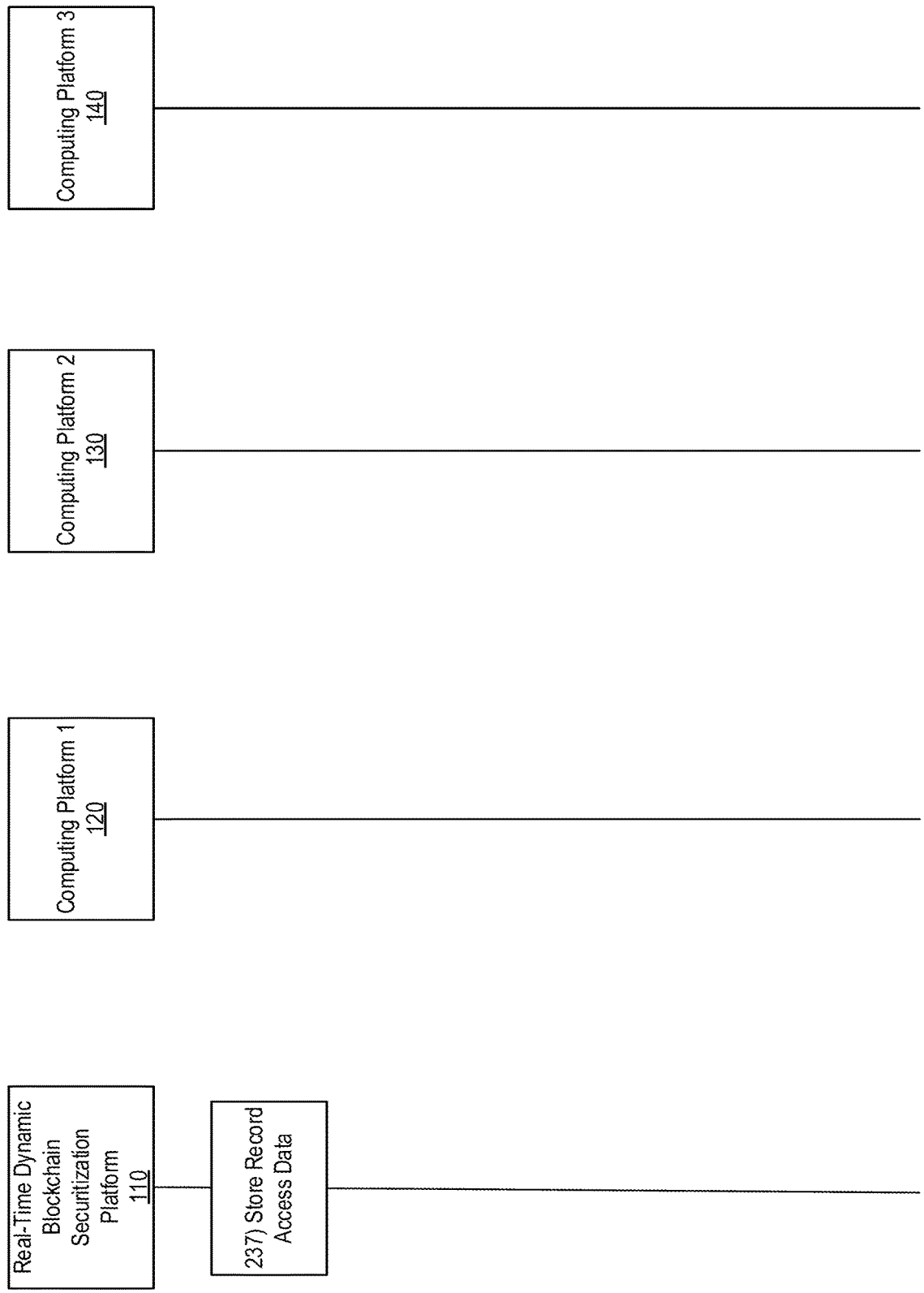

REAL-TIME DYNAMIC BLOCKCHAIN SECURITIZATION PLATFORM

BACKGROUND

Aspects of the disclosure relate to real-time dynamic securitization of blockchain records. In particular, one or more aspects of the disclosure relate to dynamically securitizing, in real-time and in response to a user request to access records stored in a distributed ledger, the records prior to granting the user request.

In some cases, enterprise organizations may use distributed ledgers to maintain confidential records. Allowing unregulated access to those confidential records may result in the exposure of confidential data. Further, as the confidentiality of those records changes, traditional blockchain systems require the creation of new records to reflect the modified confidentiality, thus resulting in unfeasibly large distributed ledgers, which are both costly and technically difficult to maintain. To improve the security of blockchain systems, there is a need for a platform that dynamically securitizes blockchain records prior to granting access to those records to requesting users.

SUMMARY

Aspects of the disclosure provide effective, efficient, scalable, and convenient technical solutions that address and overcome the technical problems associated with conventional blockchain record access. In accordance with one or more embodiments of the disclosure, a computing platform comprising at least one processor, a communication interface, and memory storing computer-readable instructions may receive a request to retrieve records from a second computing platform. The computing platform may generate a graphical user interface in response to receiving the request to retrieve records. The computing platform may send the graphical user interface to the second computing platform, wherein sending the graphical user interface to the second computing platform is configured to cause the second computing platform to output the graphical user interface for display to a display device of the second computing platform. The computing platform may receive, from the second computing platform, record retrieval data comprising user data identifying a user associated with the record retrieval data and further comprising record data identifying one or more requested records. The computing platform may validate, for a first requested record of the one or more requested records, the user. The computing platform may decrypt the first requested record to generate a decrypted requested record. The computing platform may parse the decrypted requested record to generate parsed record data. The computing platform may compare the parsed record data with predetermined textual content. The computing platform may determine, based on a result of the comparing, that the parsed record data comprises a subset of predetermined textual content. The computing platform may compare, for each predetermined textual content in the subset of predetermined textual content, a confidentiality level associated with that predetermined textual content with an access level associated with the user. The computing platform may mark, based on a result of the comparing, one or more predetermined textual content of the subset of predetermined textual content for securitization. The computing platform may generate a securitized record by redacting, from the decrypted requested record, each of the one or more predetermined textual content marked for securitization.

In one or more instances, the computing platform may determine that validation of the user for a second requested record of the one or more requested records was unsuccessful. In one or more instances, the computing platform may generate a second graphical user interface comprising a first section and a second section. In one or more instances, the computing platform may send, to the second computing platform, the graphical user interface, wherein sending the graphical user interface to the second computing platform is configured to cause the second computing platform to output the second user interface for display to the display device of the second computing platform. In one or more instances, the first section of the second graphical user interface may be associated with the first requested record and may comprise the securitized record. In one or more instances, the second section of the second graphical user interface may be associated with the second requested record and may comprise an indication that validation of the user for the second requested record was unsuccessful.

In one or more instances, the record data identifying the one or more requested records may comprise a unique document identification number of each requested record of the one or more requested records.

In one or more instances, the computing platform may validate the user based on the user data in the record retrieval data.

In one or more instances, the predetermined textual content may be dynamically modified.

In one or more instances, the computing platform may update a log with the securitized record.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for implementing a real-time dynamic blockchain securitization platform in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a real-time dynamic blockchain securitization platform. To improve the security, privacy, efficiency, and speed of data storage, an enterprise may implement a blockchain-based data storage and access system. For example, the enterprise may implement blockchains using distributed ledgers. In such a system, multiple computing systems may store copies of records in their ledgers. The records may store confidential data. Users associated with the enterprise may access the records and thus, the confidential data stored therein. This may potentially lead to unauthorized access of confidential data stored in the records. Thus, implementation of a blockchain storage and access system may result in substantial security breaches due to the substantial number of users that are accessing the confidential records.

The confidentiality level of the data in the blockchain records may vary over time. And different users accessing a same record may have different access rights to the data in that record. Accordingly, aspects described here may employ dynamic real-time securitization of blockchain record data for blockchain storage and access systems. Specifically, before records are sent to the computing platforms for verification and storage in the blockchain, the real-time dynamic blockchain securitization platform may securitize the record through encryption and/or other securitization processes. Additionally, prior to granting a user access to a blockchain record, the real-time dynamic blockchain securitization platform may both validate the user and perform real-time dynamic securitization of the blockchain record through decryption, redaction and/or other securitization processes. Aspects of the present disclosure thus allow for a system that may enjoy the many advantages of blockchain storage and access without compromising the confidentiality or security of the records.

Figure 1A:
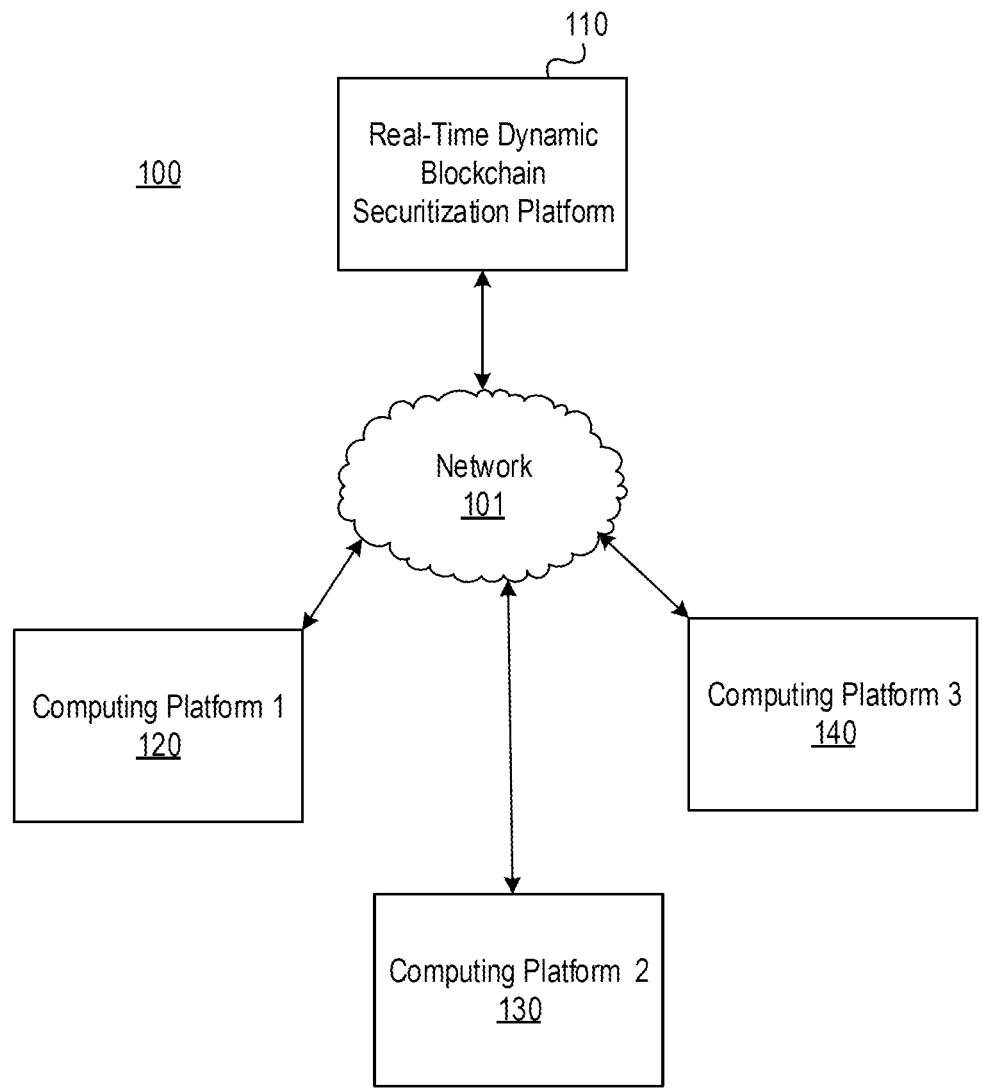
FIGS. 1A-1B depict an illustrative computing environment for implementing a real-time dynamic blockchain securitization platform in accordance with one or more example embodiments.
Figure 1B:
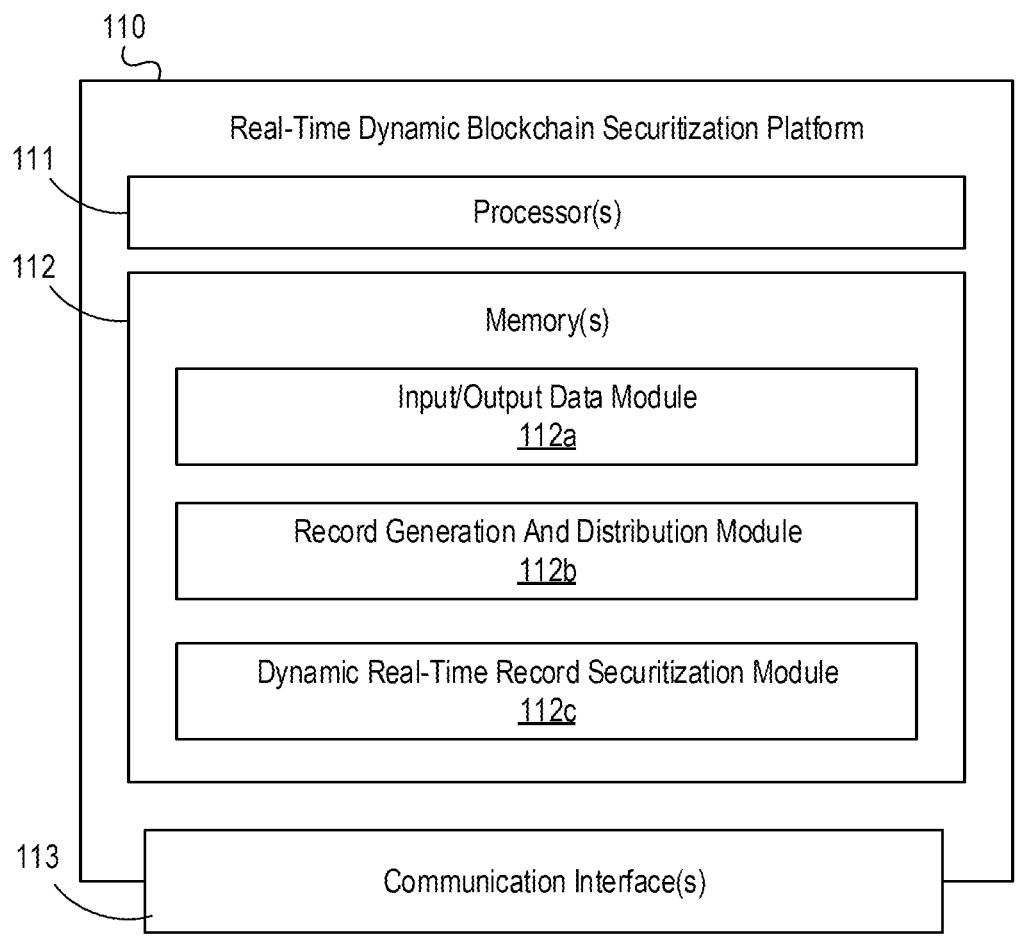

FIGS. 1A-1B depict an illustrative computing environment that implements a real-time dynamic blockchain securitization platform. Referring to FIG. 1A, computing environment 100 may include one or more computer systems. For example, computing environment 100 may include a real-time dynamic blockchain securitization platform 110, computing platform 120, computing platform 130, and computing platform 140.

As described further below, real-time dynamic blockchain securitization platform 110 may be a computer system that includes one or more computing devices (e.g., servers, server blades, or the like) and/or other computer components (e.g., processors, memories, communication interfaces) that may be used to identify, generate, securitize, and maintain one or more distributed ledgers. In some instances, real-time dynamic blockchain securitization platform 110 may be controlled or otherwise maintained by an enterprise organization such as a financial institution.

Computing platform 120 may be a computer system that includes one or more computing devices (e.g., servers, server blades, laptop computers, desktop computers, mobile devices, tablets, smart phones, credit card readers, or the like) and/or other computer components (e.g., processors, memories, communication interfaces) that may be used to perform enterprise operations and/or data processing. In one or more instances, computing platform 120 may be configured to communicate with real-time dynamic blockchain securitization platform 110 for blockchain record creation and/or blockchain record access. Computing platform 130 and computing platform 140 may be computing platforms similar to computing platform 120.

Computing environment 100 also may include one or more networks, which may interconnect real-time dynamic blockchain securitization platform 110, computing platform 120, computing platform 130, and computing platform 140. For example, computing environment 100 may include a network 101 (which may interconnect, e.g., real-time dynamic blockchain securitization platform 110, computing platform 120, computing platform 130, and computing platform 140).

In one or more arrangements, real-time dynamic blockchain securitization platform 110, computing platform 120, computing platform 130, and computing platform 140, may be any type of computing device capable of sending and/or receiving requests and processing the requests accordingly. For example, real-time dynamic blockchain securitization platform 110, computing platform 120, computing platform 130, and computing platform 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time dynamic blockchain securitization platform 110, computing platform 120, computing platform 130, and computing platform 140, may, in some instances, be special-purpose computing devices configured to perform specific functions.

Referring to FIG. 1B, real-time dynamic blockchain securitization platform 110 may include one or more processors 111, memory 112, and communication interface 113. A data bus may interconnect processor 111, memory 112, and communication interface 113. Communication interface 113 may be a network interface configured to support communication between real-time dynamic blockchain securitization platform 110 and one or more networks (e.g., network 101, or the like). Memory 112 may include one or more program modules having instructions that when executed by processor 111 cause real-time dynamic blockchain securitization platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time dynamic blockchain securitization platform 110 and/or by different computing devices that may form and/or otherwise make up real-time dynamic blockchain securitization platform 110. For example, memory 112 may have, host, store, and/or include input/output data module 112a, record generation and distribution module 112b, and dynamic real-time record securitization module 112c.

Input/Output data module 112a may have instructions that direct and/or cause real-time dynamic blockchain securitization platform 110 to receive input data from any of the computing platforms shown in FIG. 1A (i.e., computing platform 120, computing platform 130, and computing platform 140), and/or to output data to any of the computing platforms shown in FIG. 1A (i.e., computing platform 120, computing platform 130, and computing platform 140). Record generation and distribution module 112b may analyze record generation data received by input/output data module 112a and generate securitized blockchain records. The securitized blockchain records may be distributed to any of the computing platforms shown in FIG. 1A (i.e., computing platform 120, computing platform 130, and computing platform 140) via input/output data module 112*a* and/or record generation and distribution module 112*b* for addition to distributed ledgers maintained by those computing platforms. Dynamic real-time record securitization module 112*c* may retrieve and securitize requested blockchain records prior to sending the securitized blockchain records to various computing platforms (i.e., computing platform 120, computing platform 130, and/or computing platform 140).

Figure 2A:
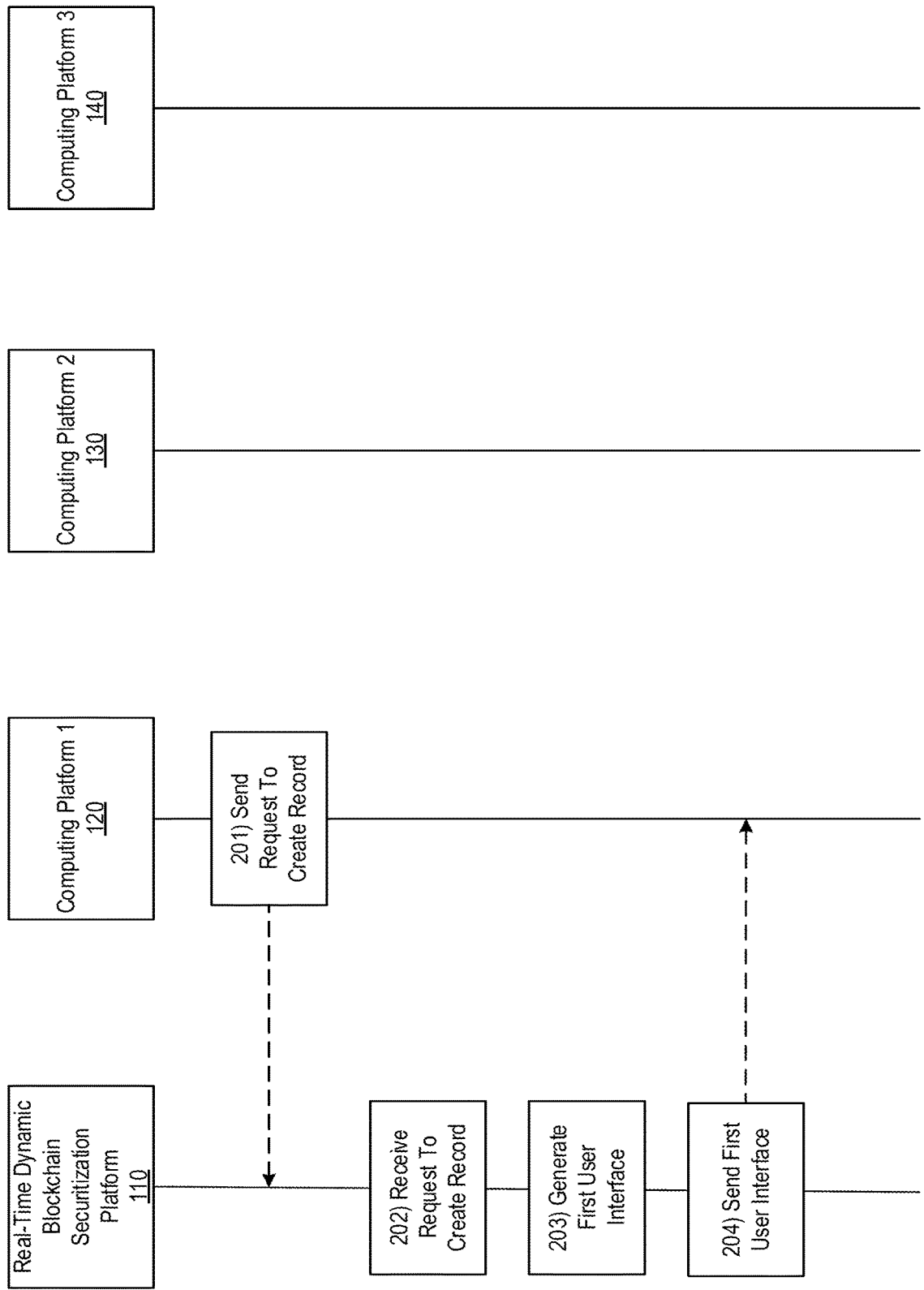
Figure 2B:
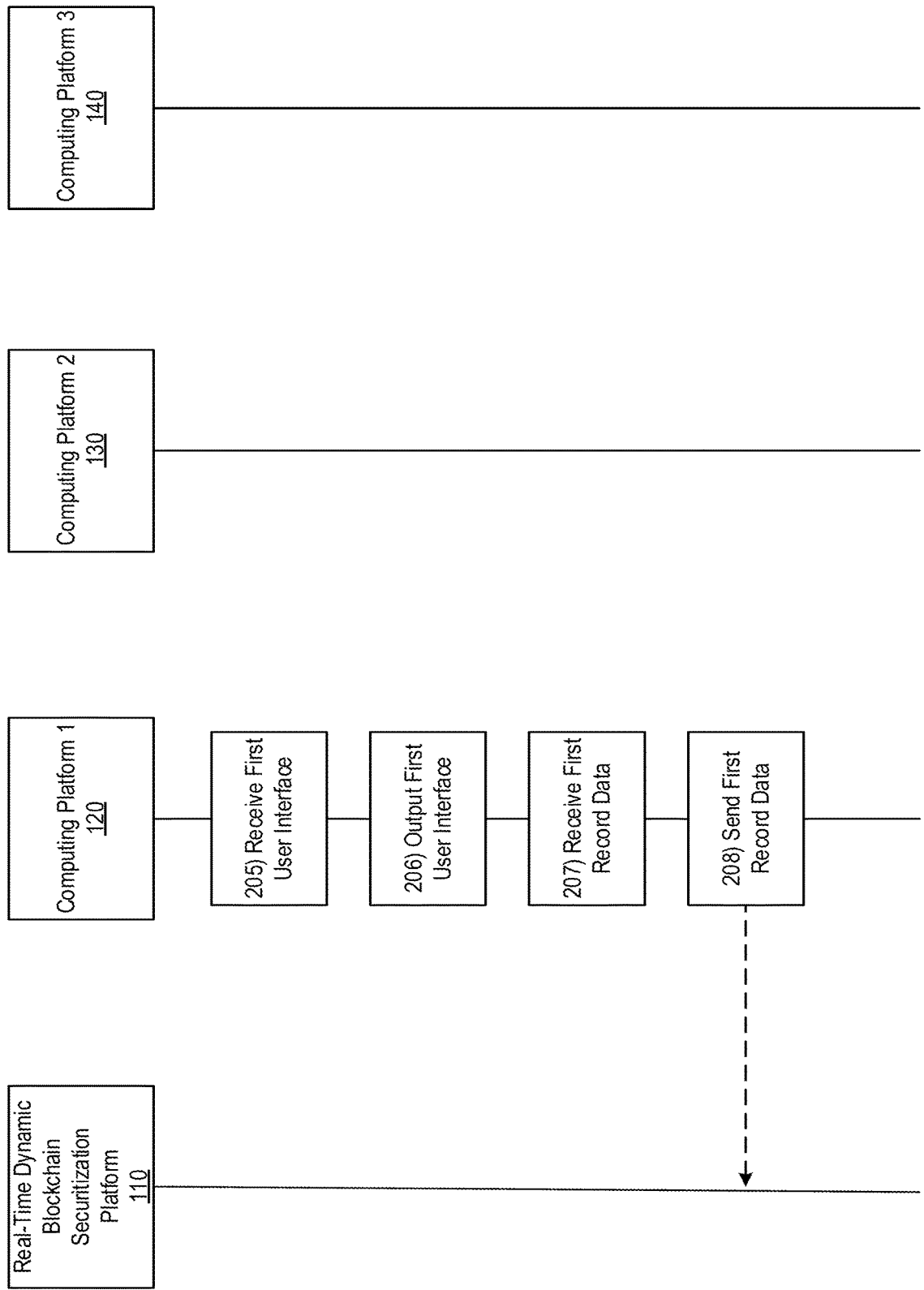

FIGS. 2A-2J depict an illustrative event sequence for implementing a real-time dynamic blockchain securitization platform in accordance with one or more example embodiments. Referring to FIG. 2A, at step 201, computing platform 120 may send a request to create a blockchain record to real-time dynamic blockchain securitization platform 110. Computing platform 120 may send the request to create the blockchain record to real-time dynamic blockchain securitization platform 110 in response to receiving a user request at computing platform 120 to create the blockchain record. At step 202, real-time dynamic blockchain securitization platform 110 may receive the request to create the blockchain record from computing platform 120. In response to receiving the request to create the blockchain record from computing platform 120 at step 202, real-time dynamic blockchain securitization platform 110 may generate, at step 203, a first graphical user interface.

Figure 3A:
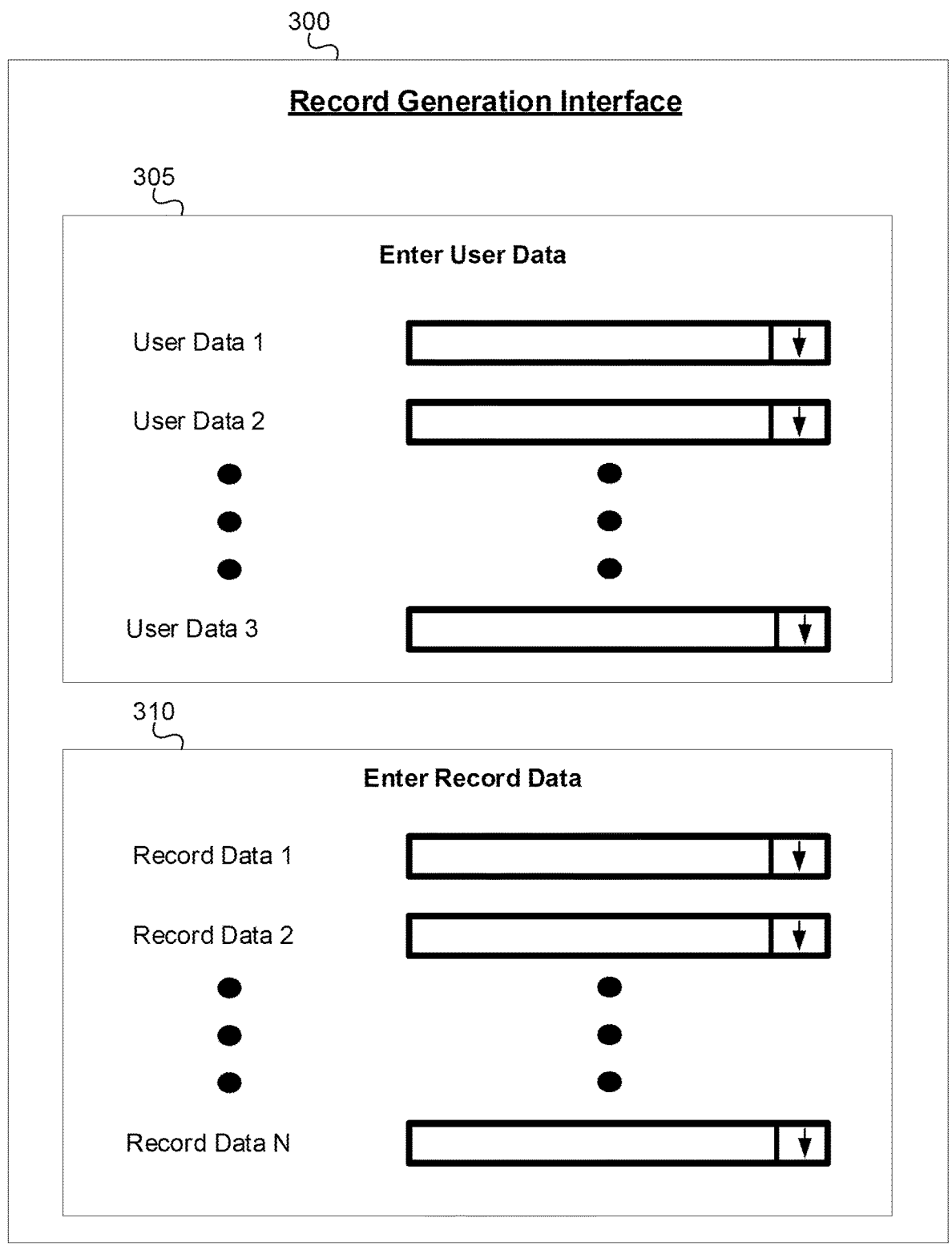
FIGS. 3A-3C depict illustrative graphical user interfaces that implement a real-time dynamic blockchain securitization platform in accordance with one or more example embodiments.

FIG. 3A illustrates an example first graphical user interface 300 that may be generated by real-time dynamic blockchain securitization platform 110 at step 203 and presented to the user in response to a user request to create a blockchain record. The first graphical user interface 300 may include sections 305 and 310. Section 305 of first graphical user interface 300 may include one or more data fields for receiving user data. The user data may include authentication data for the user, such as a username, user ID, user password, and/or the like. Section 310 of first graphical user interface 300 may include one or more data fields for receiving record data. The record data may include the data to be stored in the record, the location of files containing the data to be stored in the record, and/or configuration parameters for the record.

Referring back to FIG. 2A, at step 204, real-time dynamic blockchain securitization platform 110 may send the first graphical user interface 300 generated by real-time dynamic blockchain securitization platform 110 at step 203 to computing platform 120. The sending of the first graphical user interface 300 by real-time dynamic blockchain securitization platform 110 to computing platform 120 may cause and/or be configured to cause computing platform 120 to output the first graphical user interface 300 for display to a user. Specifically, referring to FIG. 2B, at step 205, computing platform 120 may receive the first graphical user interface 300 from real-time dynamic blockchain securitization platform 110. At step 206, computing platform 120 may output the first graphical user interface 300 received by computing platform 120 from real-time dynamic blockchain securitization platform 110 to a display device of computing platform 120.

At step 207, in response to outputting the first graphical user interface 300 to the display device, computing platform 120 may receive first record data via the first graphical user interface 300. The first record data may include the user data and the record data discussed above with reference to FIG. 3A. At step 208, computing platform 120 may send the first record data (e.g., the user data and the record data) to real-time dynamic blockchain securitization platform 110.

Referring to FIG. 2C, at step 209, real-time dynamic blockchain securitization platform 110 may receive the first record data from computing platform 120. At step 210, real-time dynamic blockchain securitization platform 110 may generate a first record based on the first record data received by real-time dynamic blockchain securitization platform 110 from computing platform 120. The first record may include the record data received by real-time dynamic blockchain securitization platform 110 from computing platform 120. If the record data included a file location of data to be included in the first record, real-time dynamic blockchain securitization platform 110 may retrieve the data from the specified file location and add the retrieved data to the first record. The first record may include the user data within the first record itself or as metadata. In one example, prior to generating the first record, real-time dynamic blockchain securitization platform 110 may validate that the user has permission to create and store records within the blockchain. Real-time dynamic blockchain securitization platform 110 may validate the user based on the user data received by real-time dynamic blockchain securitization platform 110 from computing platform 120 at step 209. During generation of the first record, real-time dynamic blockchain securitization platform 110 may assign a unique document identification number to the first record. The unique document identification may be included within the first record itself, or may be included in the metadata of the first record.

At step 211, real-time dynamic blockchain securitization platform 110 may securitize the first record by encrypting the first record. Real-time dynamic blockchain securitization platform 110 may encrypt the first record using symmetric encryption or asymmetric encryption. Real-time dynamic blockchain securitization platform 110 may use a predetermined encryption algorithm to encrypt the first record, or may dynamically determine the encryption algorithm based on the contents of the first record, based on one or more configuration settings for the blockchain, and/or the like. In one example, real-time dynamic blockchain securitization platform 110 may encrypt the first record based on the Data Encryption Standard (DES). In another example, real-time dynamic blockchain securitization platform 110 may encrypt the first record based on the Advanced Encryption Standard (AES). Real-time dynamic blockchain securitization platform 110 may encrypt the first record using one or more public keys, one or more private keys, or a combination of public and private keys. The encryption of the first block by real-time dynamic blockchain securitization platform 110 may further be based on a hash of the current blockchain block and/or the previous blockchain block.

At step 212, real-time dynamic blockchain securitization platform 110 may distribute the encrypted first record (comprising the unique document identification number assigned to the first record by real-time dynamic blockchain securitization platform 110) to various computing platforms for authentication and storage in the distributed ledger. In one example, real-time dynamic blockchain securitization platform 110 may distribute the securitized first record to computing platform 120, computing platform 130, and computing platform 140. This is merely exemplary, and real-time dynamic blockchain securitization platform 110 may distribute the securitized first record to a fewer number of computing platforms or a greater number of computing platforms. The distribution of the encrypted first record by real-time dynamic blockchain securitization platform 110 to the computing platforms may cause and/or be configured to cause the computing platforms to store the encrypted first record in a distributed ledger maintained at those receiving computing platforms.

Figure 2D:
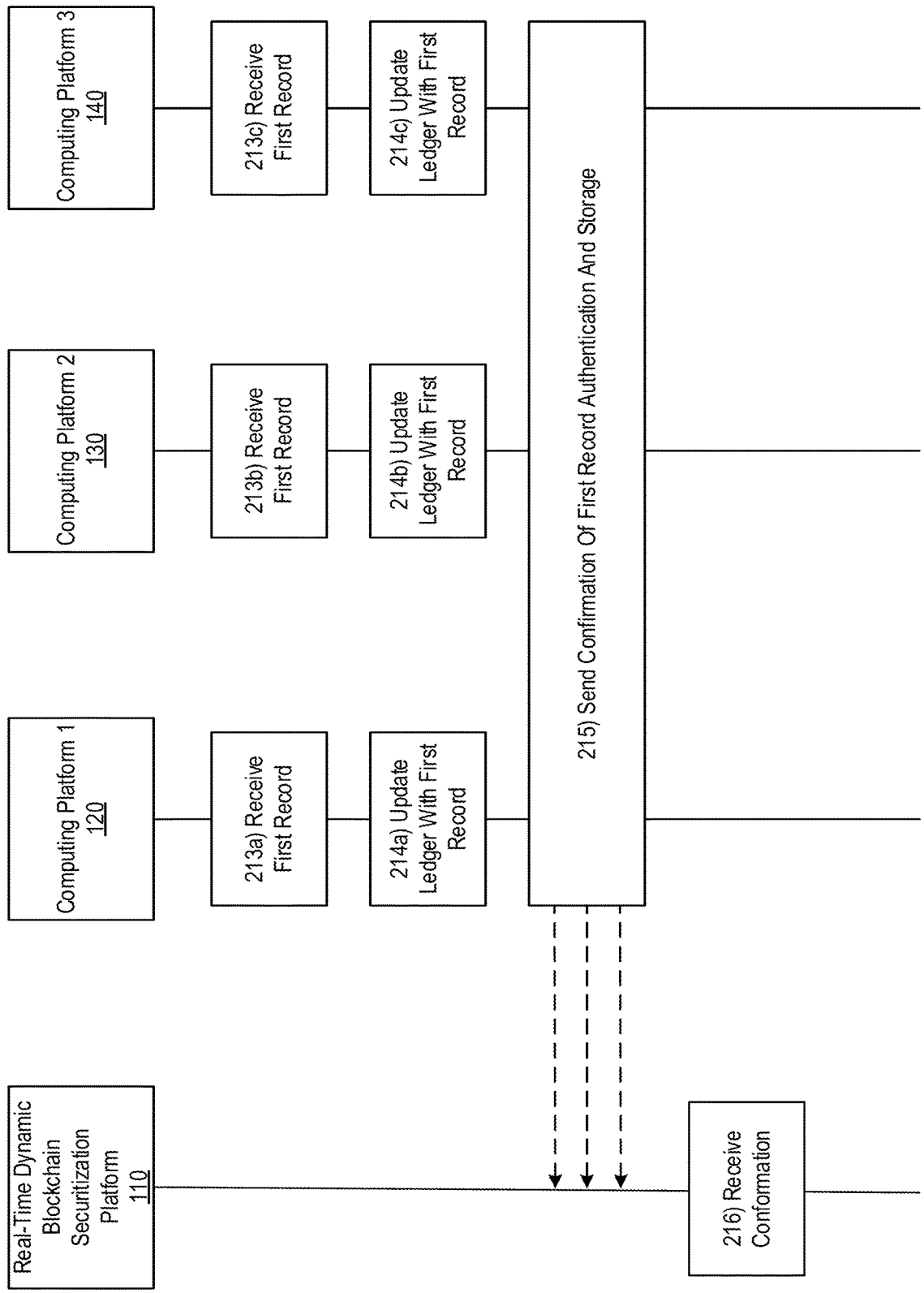

Specifically, referring to FIG. 2D, at steps 213*a*, 213*b*, and 213*c*, the encrypted first record may be received by computing platform 120, computing platform 130, and computing platform 140, respectively. Although FIG. 2D shows steps 213*a*, 213*b*, and 213*c* occurring in parallel, it is understood that each of the computing platforms may receive the encrypted first record at different times (for example, due to different network latencies, bandwidths, and/or the like). In response to receiving the encrypted first record from real-time dynamic blockchain securitization platform 110, each of computing platform 120, computing platform 130, and computing platform 140 may authenticate the encrypted first record. At step 214*a*, computing platform 120 may store the encrypted first record in its ledger. At step 214*b*, computing platform 130 may store the encrypted first record in its ledger. And at step 214*c*, computing platform 140 may store the encrypted first record in its ledger. Although FIG. 2D shows steps 214*a*, 214*b*, and 214*c* occurring in parallel, it is understood that updating of the ledgers stored by each of the computing platforms may occur at different times (e.g., due to different computing platforms receiving the encrypted first record at different times and/or the different computing platforms authenticating the encrypted first record at different times).

At step 215, each of computing platform 120, computing platform 130, and computing platform 140 may send, to real-time dynamic blockchain securitization platform 110, a confirmation of the authentication of the encrypted first record and the storage of the encrypted first record. Computing platform 120, computing platform 130, and computing platform 140 may perform step 215 at the same time or at different times. At step 216, real-time dynamic blockchain securitization platform 110 may receive the confirmations from each of computing platform 120, computing platform 130, and computing platform 140.

Figure 2E:
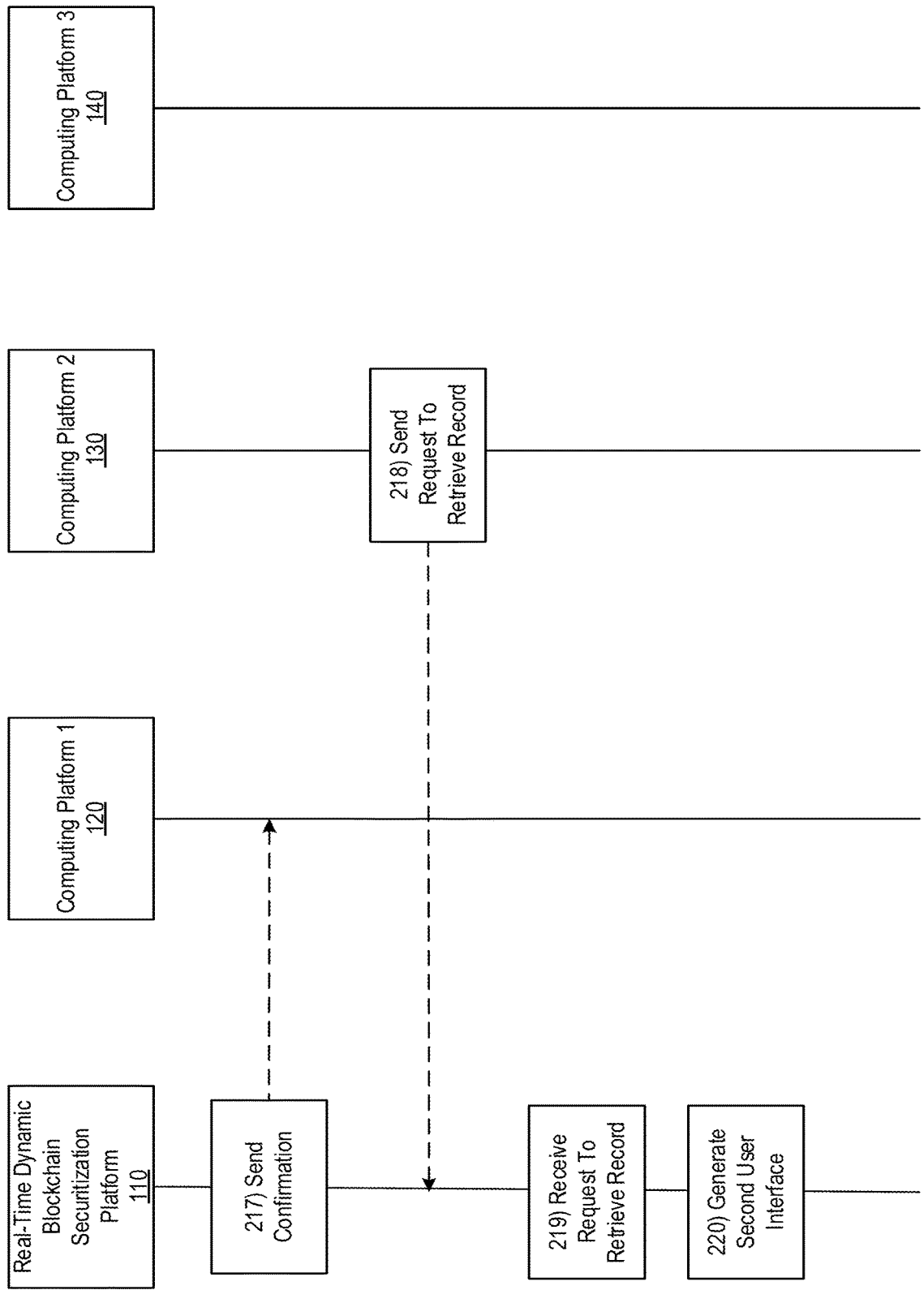

Referring to FIG. 2E, at step 217, real-time dynamic blockchain securitization platform 110 may send a confirmation to computing platform 120 that the request to create a first record (sent from computing platform 120 to real-time dynamic blockchain securitization platform at step 201) has been completed. Steps 201-217 may be repeatedly performed each time a user wants to add a record to a distributed ledger maintained by the enterprise organization. Thus, each distributed ledger maintained by the enterprise organization may be comprised of securitized records that, as discussed below, may be further securitized in real-time in response to user requests to access those records.

At step 218, computing platform 130 may send a request to retrieve one or more records from the blockchain to real-time dynamic blockchain securitization platform 110. Computing platform 130 may send the request to retrieve the one or more records from the blockchain to real-time dynamic blockchain securitization platform 110 in response to receiving a request from a user at computing platform 130 to retrieve the one or more records from the blockchain.

At step 219, real-time dynamic blockchain securitization platform 110 may receive the request to retrieve the one or more records from the blockchain from computing platform 130.

Figure 3B:
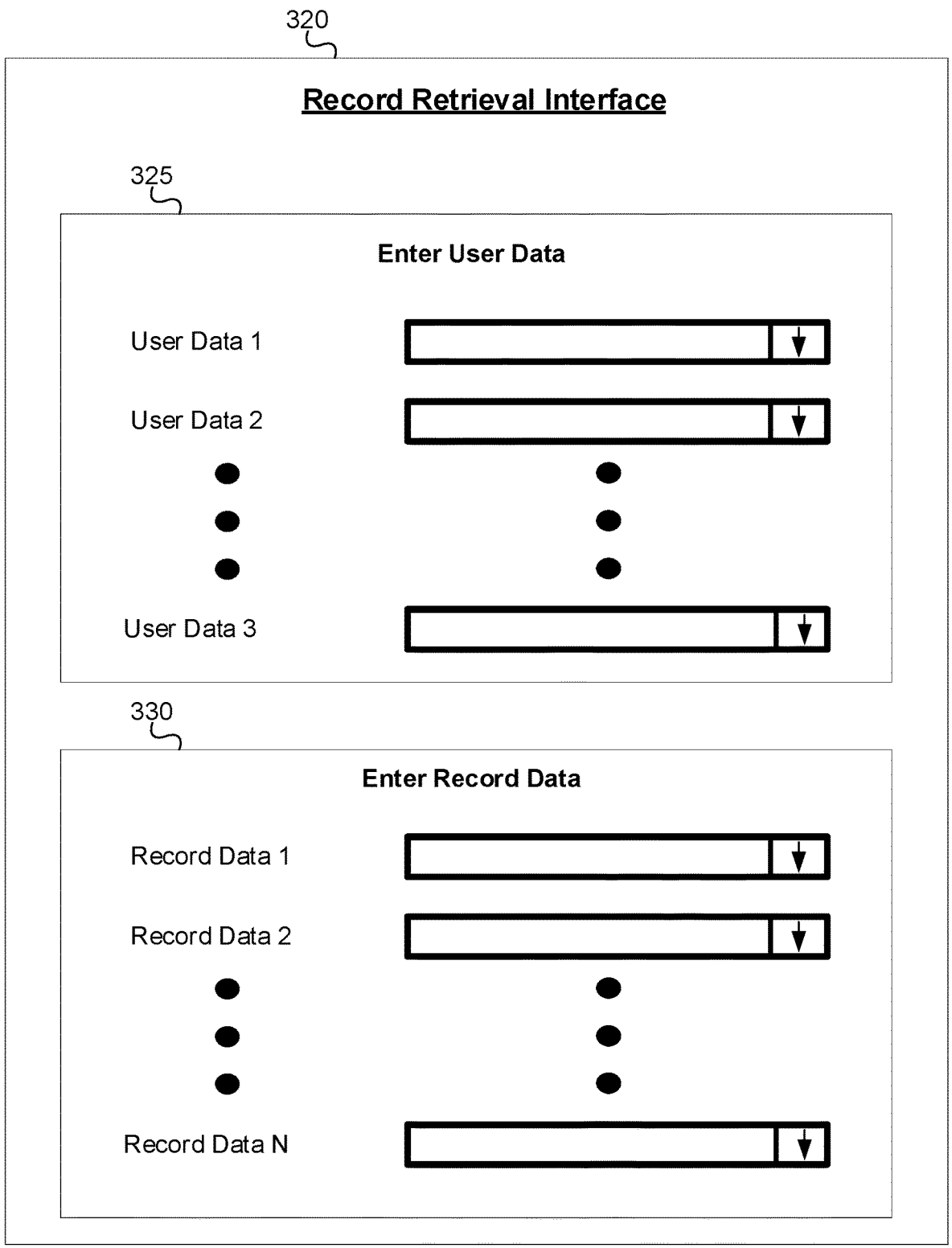

At step 220, real-time dynamic blockchain securitization platform 110 may generate a second graphical user interface. FIG. 3B illustrates an example second graphical user interface 320 that may be generated by real-time dynamic blockchain securitization platform 110 at step 217 and subsequently presented to a user at computing platform 130. Second graphical user interface 320 may include section 325 and section 330. Section 325 of second graphical user interface 320 may include one or more data fields for receiving user data. The user data may include authentication data for the user, such as a username, user ID, user password, encryption keys associated with the user, and/or the like. Section 330 of second graphical user interface 320 may include one or more data fields for receiving record data for the requested record. The record data may include a title of the requested record, a unique document identification number of the requested record, one or more keywords associated with the requested record, and/or other data identifying the requested record. If the user is requesting access to multiple records from the blockchain, record data may be received for each requested record. For example, the user may enter, in section 330, the unique document identification number of each blockchain record that the user is requesting access to.

Figure 2F:
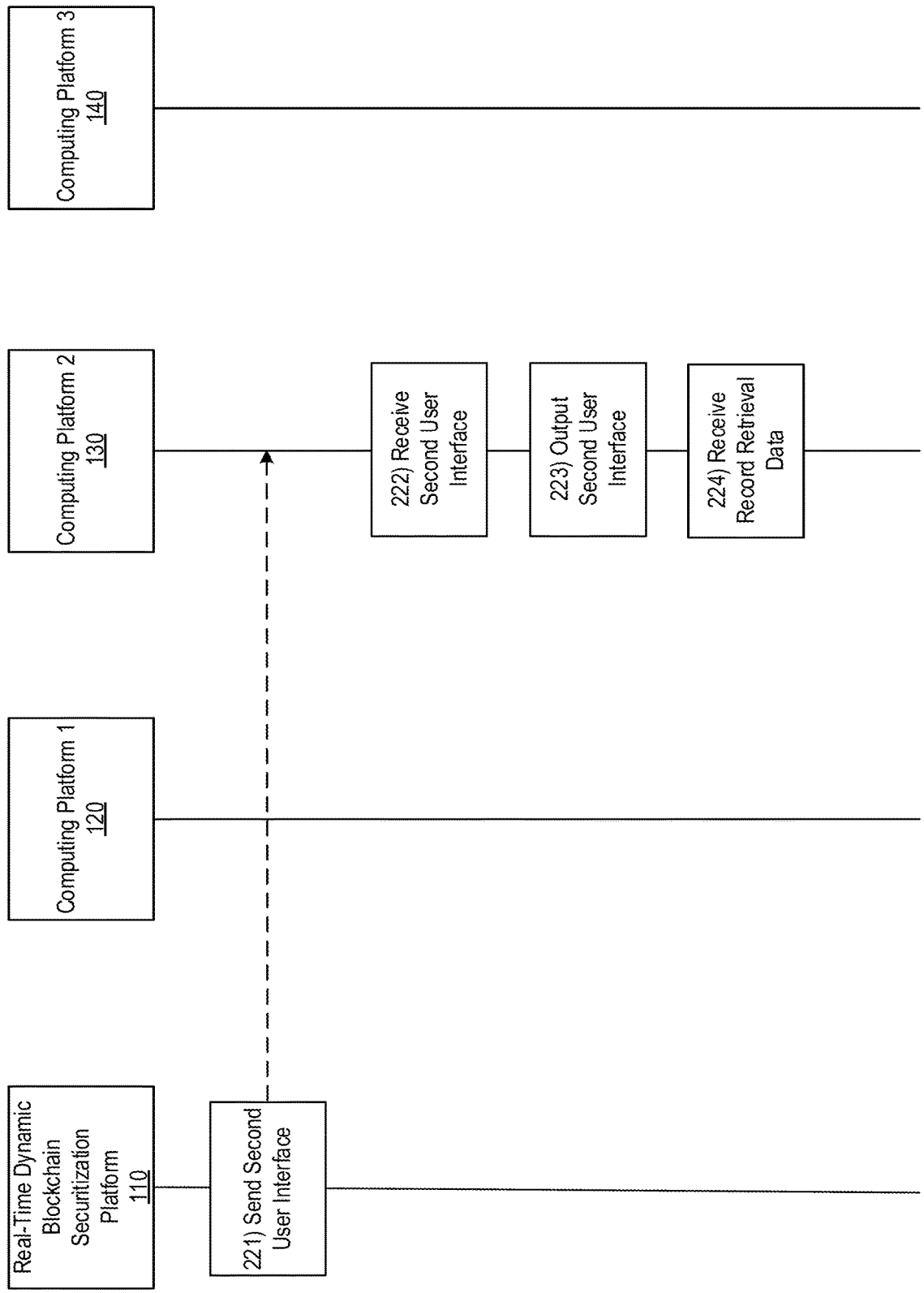

Referring to FIG. 2F, at step 221, real-time dynamic blockchain securitization platform 110 may send second graphical user interface 320 generated by real-time dynamic blockchain securitization platform 110 at step 220 to computing platform 130. The sending of second graphical user interface 320 by real-time dynamic blockchain securitization platform 110 to computing platform 130 may cause and/or be configured to cause computing platform 130 to output second graphical user interface 320 on a display device of computing platform 130. Specifically, at step 222, computing platform 130 may receive second graphical user interface 320 from real-time dynamic blockchain securitization platform 110. In response to receiving second graphical user interface 320 from real-time dynamic blockchain securitization platform 110, computing platform 130 may output, at step 223, second graphical user interface 320 to a display device of computing platform 130.

Figure 2G:
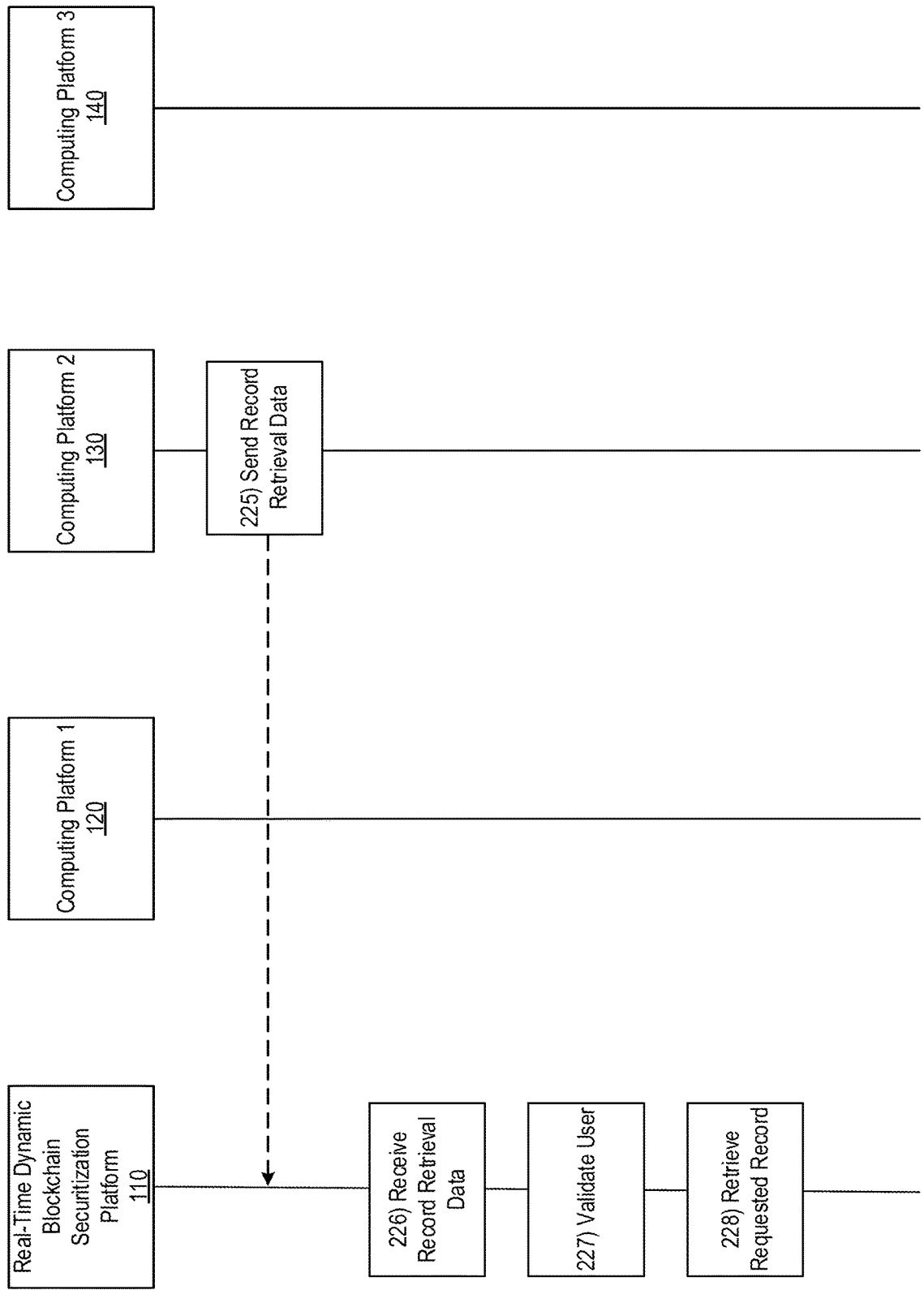

At step 224, computing platform 130 may receive record retrieval data from a user via second graphical user interface 320. The record retrieval data may include user data (entered via section 325 of second graphical user interface 320) and record data (entered via section 330 of second graphical user interface 320). In the case where a user is requesting multiple records from the blockchain, the record data may be associated with multiple requested records. Referring to FIG. 2G, at step 225, computing platform 130 may send the record retrieval data received from the user via second graphical user interface 320 to real-time dynamic blockchain securitization platform 110. At step 226, real-time dynamic blockchain securitization platform 110 may receive the record retrieval data sent by computing platform 130.

At step 227, real-time dynamic blockchain securitization platform 110 may validate the user associated with the record retrieval data. In one example, real-time dynamic blockchain securitization platform 110 may validate the user based on the user data (which, as discussed above, may include authentication data) included in the record retrieval data received by real-time dynamic blockchain securitization platform 110 from computing platform 130. In another example, real-time dynamic blockchain securitization platform 110 may separately query computing platform 130 for the authentication data for the user. Additionally, or alternatively, real-time dynamic blockchain securitization platform 110 may retrieve system-level user data for validating the user. For example, the user may be associated with particular access rights set by a system administrator of the enterprise. When validating the user, real-time dynamic blockchain securitization platform 110 may first use the authentication data provided by the user to validate that the user has provided the correct security credentials for accessing blockchain records. This authentication data may include a username, password, private encryption key, and/or the like. Real-time dynamic blockchain securitization platform 110 may also use the system-level user data to validate that the user has access rights to the particular blockchain record(s) requested by the user.

As noted above, the record retrieval data received by real-time dynamic blockchain securitization platform 110 from computing platform 130 may include a request for one or more blockchain records. For each requested blockchain record for which real-time dynamic blockchain securitization platform 110 successfully validates the user, real-time dynamic blockchain securitization platform 110 may proceed to perform steps 228-232 for that requested record, each of which is discussed in turn below. For each requested record for which real-time dynamic blockchain securitization platform 110 does not successfully validate the user (for example, if the user requests a record that the user does not have access rights to), real-time dynamic blockchain securitization platform 110 may bypass steps 228-232 for that requested record. Once real-time dynamic blockchain securitization platform 110 has completed processing all of the requested records, real-time dynamic blockchain securitization platform 110 may proceed to step 233, discussed below.

At step 228, in response to real-time dynamic blockchain securitization platform 110 successfully authenticating the user for a requested record, real-time dynamic blockchain securitization platform 110 may retrieve the requested record from the blockchain. Each of the records stored in the blockchain may have been created, securitized, and stored in the blockchain by real-time dynamic blockchain securitization platform 110 as discussed above with reference to steps 201-217. Thus, each record stored in the blockchain may be an encrypted record that is associated with a unique document identification number. Real-time dynamic blockchain securitization platform 110 may retrieve the requested record by searching the blockchain using the unique document identification number associated with the requested record. In one example, real-time dynamic blockchain securitization platform 110 may search the blockchain using a Merkle Tree Searching algorithm.

Referring to FIG. 2H, at step 229, real-time dynamic blockchain securitization platform 110 may decrypt the requested record retrieved from the blockchain to generated a decrypted requested record. As discussed above with reference to the encryption of the first record, decryption of the requested record can use one or more public keys, one or more private keys, one or more DES keys, one or more AES keys, or a combination thereof. The decryption algorithm used to decrypt the requested record may be based on the encryption algorithm that was used to initially encrypt the requested record by real-time dynamic blockchain securitization platform 110 prior to its storage in the blockchain.

At step 230, real-time dynamic blockchain securitization platform 110 may parse the requested record to generate parsed record data. In one example, real-time dynamic blockchain securitization platform 110 may use a natural language processing system to analyze each line of text in the requested record to identify the words in those lines of text, wherein the parsed record data may include the identified words.

At step 231, real-time dynamic blockchain securitization platform 110 may analyze the parsed record data of the requested record. To analyze the parsed record data, real-time dynamic blockchain securitization platform 110 may retrieve a list of predetermined textual content. Real-time dynamic blockchain securitization platform 110 may retrieve the list of predetermined textual content from storage that is internal to real-time dynamic blockchain securitization platform 110 or storage that is external to real-time dynamic blockchain securitization platform 110. The list of predetermined textual content may be dynamic and periodically updated by the enterprise system. The predetermined textual content may be predetermined keywords, phrases, sentences, and/or the like. Real-time dynamic blockchain securitization platform 110 may then compare the list of predetermined textual content to the parsed record data to determine whether the requested record includes any of the predetermined textual content.

In a first example, based on a result of the comparing, real-time dynamic blockchain securitization platform 110 may determine that the requested record does not include any predetermined textual content. In a second example, based on a result of the comparing, real-time dynamic blockchain securitization platform 110 may determine that the requested record includes a subset of predetermined textual content. In this second example, for each predetermined textual content in the subset of predetermined textual content, real-time dynamic blockchain securitization platform 110 may retrieve the confidentiality level associated with that predetermined textual content. Real-time dynamic blockchain securitization platform 110 may retrieve the confidentiality level of each predetermined textual content from storage that is internal to real-time dynamic blockchain securitization platform 110 or storage that is external to real-time dynamic blockchain securitization platform 110. The confidentiality level of each predetermined textual content may be dynamic and may be periodically updated by the enterprise system. Real-time dynamic blockchain securitization platform 110 may also retrieve an access level associated with the user that requested the record.

Real-time dynamic blockchain securitization platform 110 may then compare the access level of the user with the confidentiality level of each predetermined textual content in the subset of predetermined textual content. Based on a result of the comparison, real-time dynamic blockchain securitization platform 110 may determine, for each predetermined textual content in the subset of predetermined textual content, whether that predetermined textual content is to be securitized by real-time dynamic blockchain securitization platform 110. For example, if real-time dynamic blockchain securitization platform 110 compares a confidentiality level of a first predetermined textual content in the subset of predetermined textual content with the access level of the requesting user and determines that the confidentiality level of the first predetermined textual content in the subset of predetermined textual content is higher than the access level of the requesting user, real-time dynamic blockchain securitization platform 110 may determine that the first predetermined textual content is to be securitized by real-time dynamic blockchain securitization platform 110, and may mark the first predetermined textual content for securitization. In another example, if real-time dynamic blockchain securitization platform 110 compares a confidentiality level of the first predetermined textual content in the subset of predetermined textual content with the access level of the requesting user and determines that the confidentiality level of the first predetermined textual content in the subset of predetermined textual content is lower than the access level of the requesting user, real-time dynamic blockchain securitization platform 110 may determine that the first predetermined textual content does not need to be securitized by real-time dynamic blockchain securitization platform 110. As stated above, this comparison of the confidentiality level of the predetermined textual content and the access level of the requesting user, and the subsequent securitization determination by real-time dynamic blockchain securitization platform 110, may be repeated by real-time dynamic blockchain securitization platform 110 for each predetermined textual content in the subset of predetermined textual content.

Once real-time dynamic blockchain securitization platform 110 has completed comparing the confidentiality level of each predetermined textual content in the subset of predetermined textual content with the access level of the requesting user, real-time dynamic blockchain securitization platform 110 may determine, based on a result of that comparing, whether each predetermined textual content in the subset of predetermined textual content is to be securitized (and if so, marking that predetermined textual content in the subset of predetermined textual content for securitization). Real-time dynamic blockchain securitization platform 110 may, at step 232, dynamically generate a securitized record in real-time. To dynamically generate the securitized record in real-time, real-time dynamic blockchain securitization platform 110 may redact, from the decrypted requested record, each predetermined textual content that was marked for securitization in step 231 by real-time dynamic blockchain securitization platform 110. For example, real-time dynamic blockchain securitization platform 110 may redact each predetermined textual content in the subset of predetermined textual content that is associated with a confidentiality level that is higher than the access level of the requesting user. Real-time dynamic blockchain securitization platform 110 may leave the remainder of the record (for example, the portions of the decrypted requested record generated by real-time dynamic blockchain securitization platform 110 that were not in the subset of predetermined textual content and/or the portions of the decrypted requested record generated by real-time dynamic blockchain securitization platform 110 that were in the subset of predetermined textual content but were associated with a confidentiality level that was not higher than the access level of the requesting user) in its original form. Thus, the securitized record generated by real-time dynamic blockchain securitization platform 110 at step 232 may be identical to the decrypted record generated at step 229 by real-time dynamic blockchain securitization platform 110, except that real-time dynamic blockchain securitization platform 110 may redact out of the securitized record each predetermined textual content in the subset of predetermined textual content that is associated with a confidentiality level that is higher than the access level of the requesting user.

As noted above, real-time dynamic blockchain securitization platform 110 may repeat steps 228-232 for each requested record for which real-time dynamic blockchain securitization platform 110 successfully validates the user. In one example, real-time dynamic blockchain securitization platform 110 may perform steps 228-232 in parallel for each requested record for which real-time dynamic blockchain securitization platform 110 successfully validates the user. In another example, real-time dynamic blockchain securitization platform 110 may perform steps 228-232 for each requested return in turn.

Figure 2I:
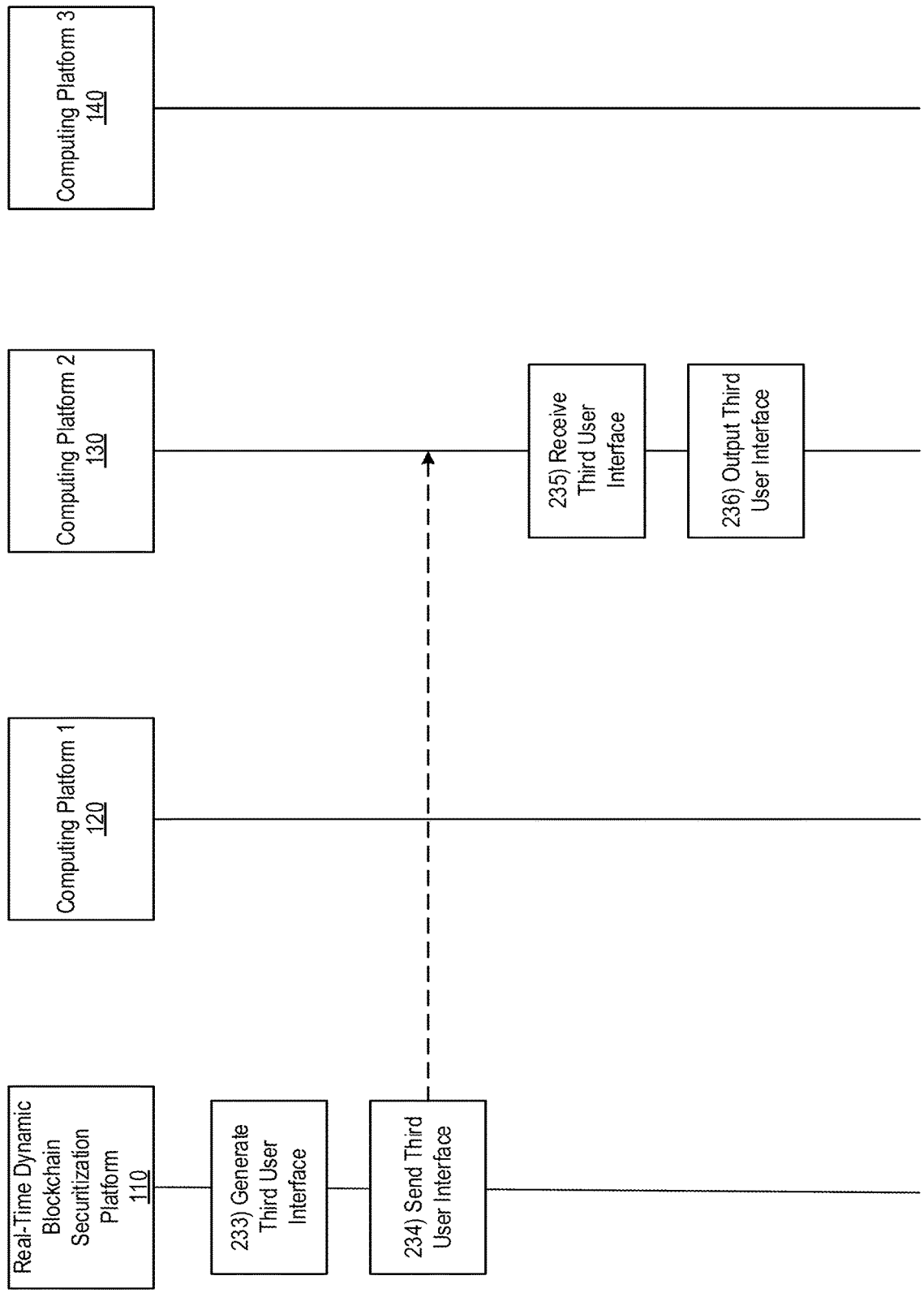
Figure 3C:
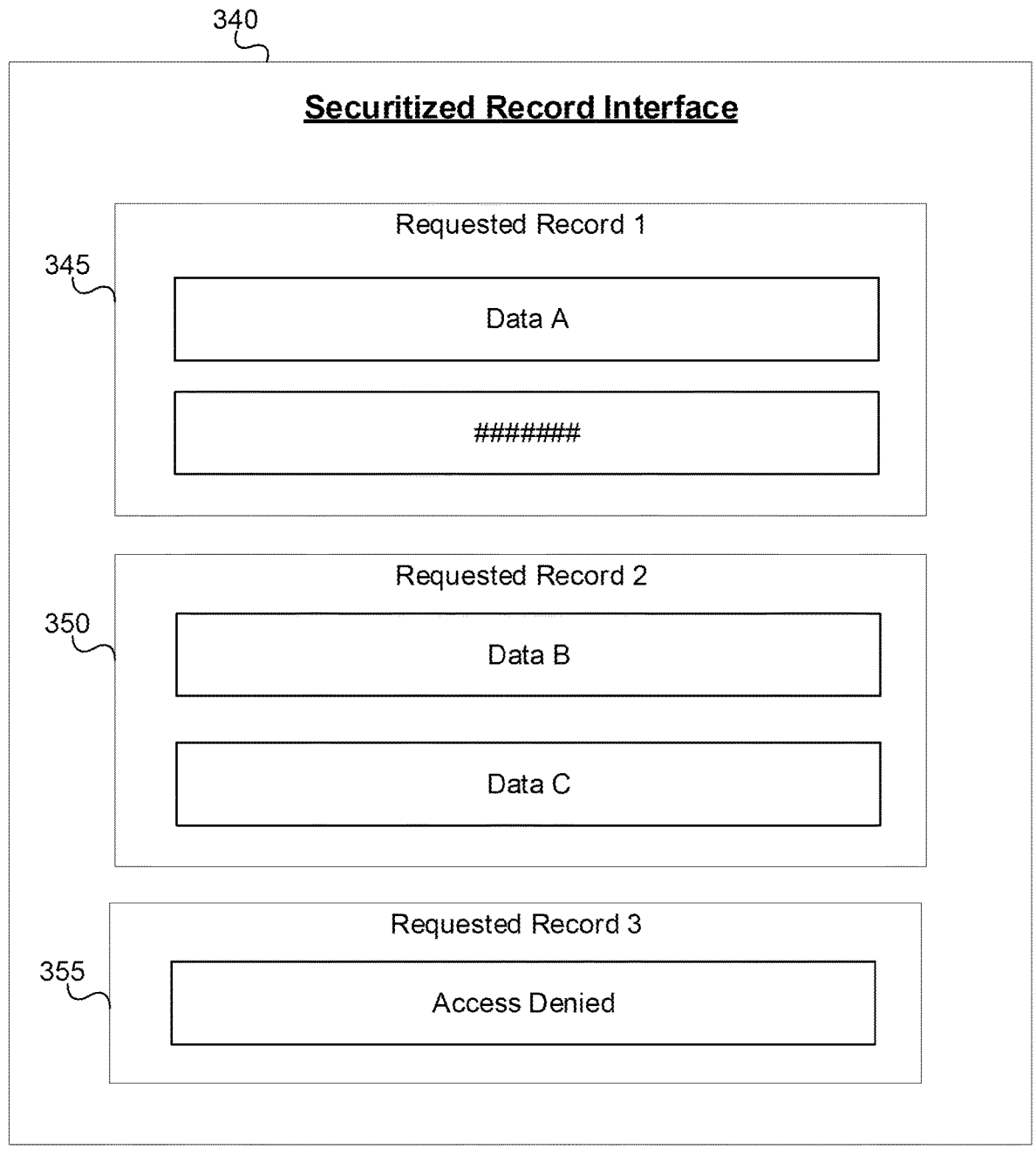

Referring to FIG. 2I, after real-time dynamic blockchain securitization platform 110 has completed processing each requested record, real-time dynamic blockchain securitization platform 110 may, at step 233, generate a third graphical user interface. FIG. 3C illustrates an example third graphical user interface 340 that may be generated by real-time dynamic blockchain securitization platform 110 at step 233 and subsequently presented to a user at computing platform 130. Third graphical user interface 340 may include separate sections for each requested record in the record retrieval data received by real-time dynamic blockchain securitization platform 110 at step 226 from computing platform 130. For example, if the record retrieval data received by real-time dynamic blockchain securitization platform 110 at step 226 included a request for three records, third graphical user interface 340 may include section 345 for the first requested record, section 350 for the second requested record, and section 355 for the third requested record. Greater or fewer sections may be included within third graphical user interface 340 without departing from the scope of the invention. The contents of each section may be based on whether real-time dynamic blockchain securitization platform 110 successfully validated the user for that particular requested record at step 227 and further based on the securitized record generated by real-time dynamic blockchain securitization platform 110 at step 232 based on a successful validation.

For example, the first section 345 of third graphical user interface 340 may include a first securitized record generated by real-time dynamic blockchain securitization platform 110 at step 232 in response to the record retrieval data received by real-time dynamic blockchain securitization platform 110 at step 226 comprising a request for the first record and further in response to real-time dynamic blockchain securitization platform 110 successfully validating the requesting user at step 227 for access to the first requested record. Here, the first securitized record may include both data from the first requested record in its original form ("Data A") and redacted data from the first requested record ("#######") that was inserted into the first securitized record based the analysis performed by real-time dynamic blockchain securitization platform 110 at step 231 for the first requested record.

The second section 350 of third graphical user interface 340 may include a second securitized record generated by real-time dynamic blockchain securitization platform 110 at step 232 in response to the record retrieval data received by real-time dynamic blockchain securitization platform 110 at step 226 comprising a request for the second record and further in response to real-time dynamic blockchain securitization platform 110 successfully validating the requesting user at step 227 for access to the second requested record. Here, the second securitized record may comprise only data from the second requested record in its original form ("Data B" and "Data C") based the analysis performed by real-time dynamic blockchain securitization platform 110 at step 231 for the second requested record (that is, the analysis performed by real-time dynamic blockchain securitization platform 110 at step 231 for the second requested record may have determined that a second decrypted requested record generated by real-time dynamic blockchain securitization platform 110 and associated with the second requested record did not include any predetermined textual content or that each predetermined textual content in the second decrypted requested record was associated with a confidentiality level that was not higher than the access level of the requesting user).

The third section 355 of third graphical user interface 340 may not include any securitized records in response to the record retrieval data received by real-time dynamic blockchain securitization platform 110 at step 226 comprising a request for the third record and further in response to real-time dynamic blockchain securitization platform 110 failing to successfully validate the requesting user at step 227 for access to the third requested record. Instead, third section 355 may include an indication that real-time dynamic blockchain securitization platform 110 was unable to successfully validate the requesting user for access to the third requested record.

Referring back to FIG. 2I, at step 234, real-time dynamic blockchain securitization platform 110 may send the third graphical user interface generated by real-time dynamic blockchain securitization platform 110 at step 233 to computing platform 130 (i.e., the computing platform from which the request to retrieve the records was received by real-time dynamic blockchain securitization platform 110 at step 219). The sending of the third graphical user interface by real-time dynamic blockchain securitization platform 110 to computing platform 130 may cause and/or be configured to cause computing platform 130 to output the third graphical user interface generated by real-time dynamic blockchain securitization platform 110 for display at computing platform 130. Specifically, at step 235, computing platform 130 may receive the third graphical user interface from real-time dynamic blockchain securitization platform 110. At step 236, computing platform 130 may output the third graphical user interface for display on a display device of computing platform 130. In addition to sending the third graphical user interface to computing platform 130 at step 234, real-time dynamic blockchain securitization platform 110 may also send each securitized record generated by real-time dynamic blockchain securitization platform 110 (or its storage location) in response to the record retrieval data received by real-time dynamic blockchain securitization platform 110 from computing platform 130 at step 226.

Referring to FIG. 2J, at step 237, real-time dynamic blockchain securitization platform 110 may update a log to include information identifying/comprising the request to retrieve the record received by real-time dynamic blockchain securitization platform 110 at step 219, the user associated with the request to retrieve the record received by real-time dynamic blockchain securitization platform 110 at step 219, the computing platform from which the request to retrieve the record was received by real-time dynamic blockchain securitization platform 110 at step 219 (i.e., computing platform 130), the contents of the record retrieval data received by real-time dynamic blockchain securitization platform 110 at step 226, the results of the user validation performed by real-time dynamic blockchain securitization platform 110 at step 227, the contents of each requested record retrieved by real-time dynamic blockchain securitization platform 110 at step 228, the results of the analysis performed by real-time dynamic blockchain securitization platform 110 at step 231 for each requested record, the content of each securitized record generated by real-time dynamic blockchain securitization platform 110 at step 232 for each requested record, and/or the like. The log may be updated by real-time dynamic blockchain securitization platform 110 each time record retrieval data or a request to retrieve a record is received by real-time dynamic blockchain securitization platform 110 from any computing platform (such as computing platform 120, computing platform 130, and/or computing platform 140).

Figure 4A:
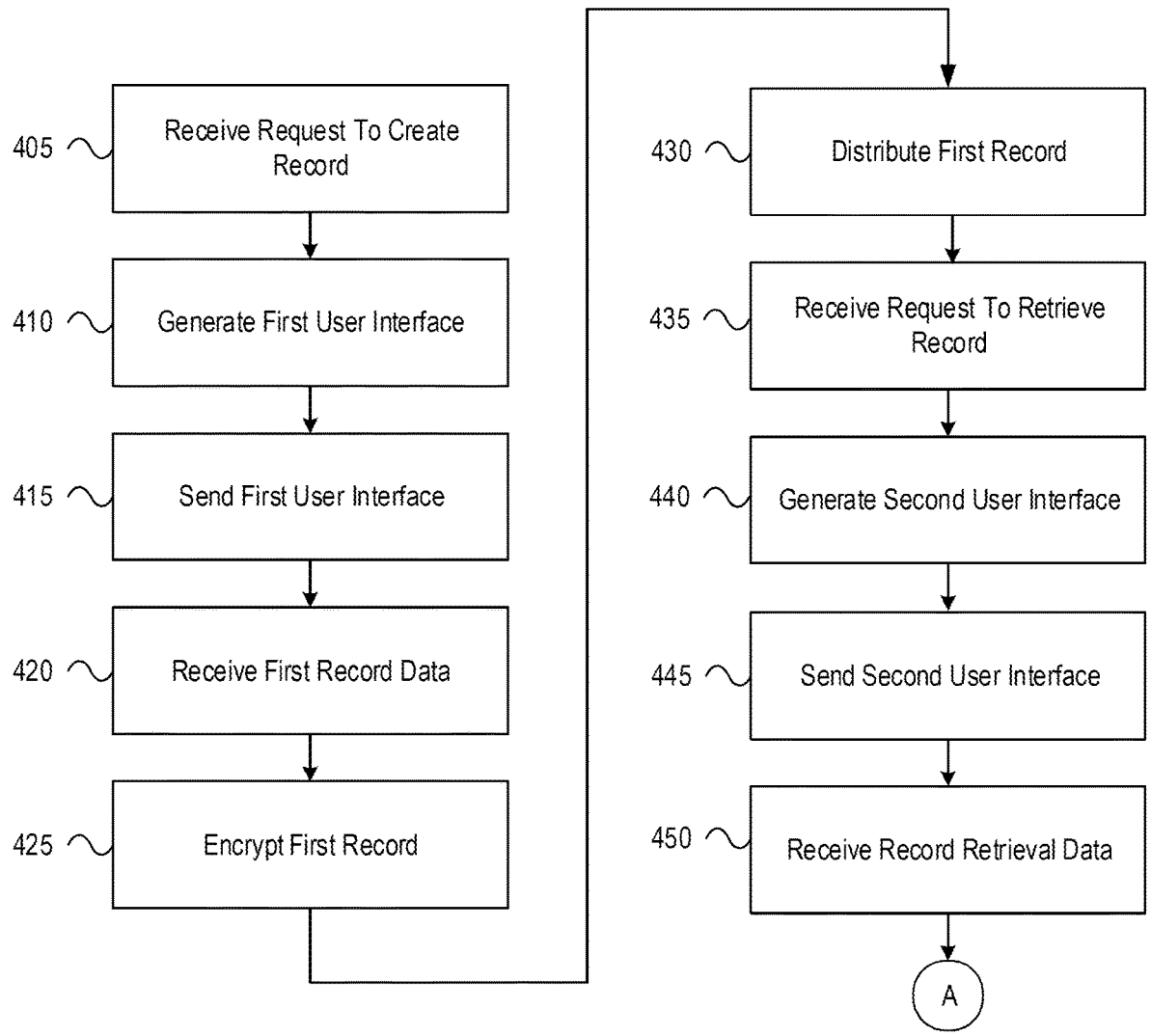
FIGS. 4A-4B depicts an illustrative method for implementing a real-time dynamic blockchain securitization platform in accordance with one or more example embodiments.
Figure 4B:
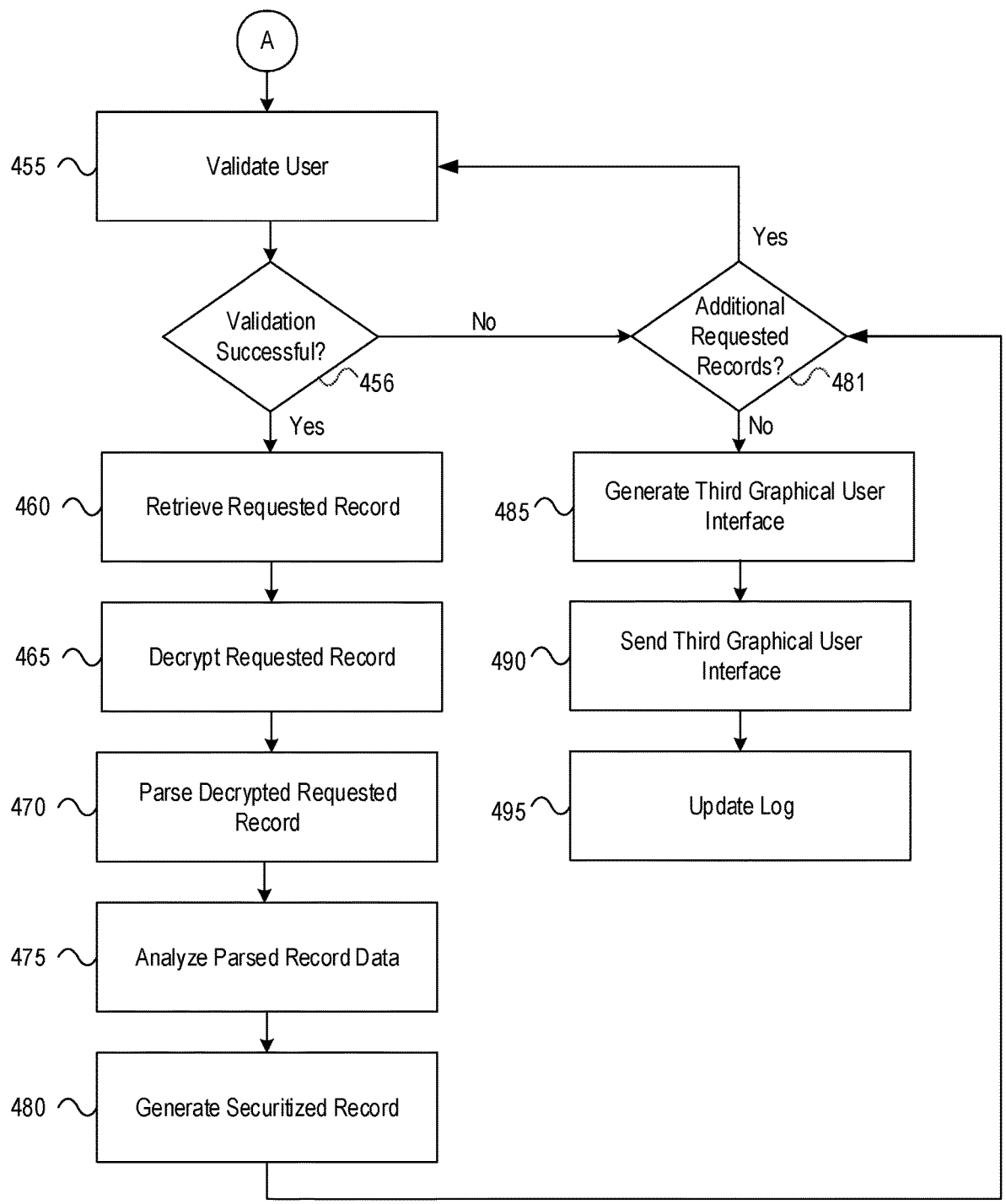

FIGS. 4A-4B depicts an illustrative method for implementing a real-time dynamic blockchain securitization platform in accordance with one or more example embodiments. Referring to FIG. 4A, at step 405, a computing platform having at least one processor, a communication interface, and memory may receive, from a first computing platform, a request to create a record. At step 410, the computing platform may generate, based on the request to create the record, a first graphical user interface. At step 415, the computing platform may send the first graphical user interface to the first computing platform, wherein the sending of the first graphical user interface by the computing platform to the first computing platform may cause and/or be configured to cause the first computing platform to output the first graphical user interface for display at the first computing platform. At step 420, the computing platform may receive first record data from the first computing platform.

At step 425, the computing platform may generate an encrypted record comprising all of the first record data, a portion thereof, and/or additional data. The additional data may include a unique document identification number for the encrypted record. At step 430, the computing platform may distribute the encrypted first record to a plurality of computing platforms. At step 435, the computing platform may receive, from a second computing platform, a request to retrieve one or more records. The computing platform may, at step 440, generate a second graphical user interface. At step 445, the computing platform may send the second graphical user interface to the second computing platform, wherein the sending of the second graphical user interface by the computing platform to the second computing platform may cause and/or be configured to cause the second computing platform to output the second graphical user interface for display at the second computing platform. At step 450, the computing platform may receive, from the second computing platform, record retrieval data. The record retrieval data may comprise user data and data identifying one or more records that the user is requested to access.

Referring to FIG. 4B, at step 455, the computing platform may validate the user for the first requested record of the requested one or more records. At step 456, the computing platform may determine whether the user was successfully validated for the first requested record. If the computing platform determines that the user was not successfully validated for the first requested record, the computing platform may proceed to step 481 (discussed below).

If the computing platform determines that the user was successfully validated for the first requested record, the computing platform may, at step 460, retrieve the first requested record. At step 465, the computing platform may decrypt the first requested record retrieved at step 460 to generate a decrypted requested record. At step 470, the computing platform may parse the decrypted requested record to generate parsed record data. At step 475, the computing platform may analyze the parsed record data. The computing platform may analyze the parsed record data by determining whether the parsed record data comprises any predetermined textual content. For each predetermined textual content identified in the parsed record data, the computing platform may compare a confidentiality level associated with that predetermined textual content with an access level of the user. Based on a result of that comparison, the computing platform may determine whether each predetermined textual content is to be marked for securitization, and if so, may mark that predetermined textual content for securitization. At step 480, the computing platform may dynamically generate a securitized record in real-time. The computing platform may generate the securitized record by redacting each predetermined textual content (that was marked for securitization by the computing platform) from the decrypted requested record.

At step 481, the computing platform may determine whether there are additional requested records in the record retrieval data received by the computing platform from the second computing platform at step 450. If, at step 481, the computing platform determines that there are additional requested records in the record retrieval data received by the computing platform from the second computing platform at step 450, processing may return to step 455 for the next requested record. If, at step 481, the computing platform determines that there are no additional requested records in the record retrieval data received by the computing platform from the second computing platform at step 450, the computing platform may proceed to step 485.

At step 485, once the computing platform has processed each of the requested records in the record retrieval data received by the computing platform from the second computing platform at step 450, the computing platform may generate a third graphical user interface. The computing platform may include, in the third graphical user interface, the processing results for each requested record in the record retrieval data received by the computing platform from the second computing platform at step 450. That is, for each requested record, if the user was successfully validated for that requested record, the third graphical user interface may include the securitized record generated by the computing platform for that requested record; if the user was not successfully validated for that requested record, the third graphical user interface may include an indication that the user was not successfully validated for that requested record. At step 490, the computing platform may send the third graphical user interface to the second computing platform, wherein the sending of the second graphical user interface by the computing platform to the second computing platform may cause and/or be configured to cause the second computing platform to output the second graphical user interface for display at the second computing platform. At step 495, the computing platform may update a log maintained by the computing platform to include information indicating the request to retrieve the record received by the computing platform, the user associated with the request to retrieve the record received by the computing platform, the second computing platform from which the request to retrieve the record was received by the computing platform, the contents of the record retrieval data received by the computing platform (for example, the unique document identification numbers), the results of the user validation performed by the computing platform for each requested record, the contents of each requested record retrieved by the computing platform, the results of the analysis performed by the computing platform for each requested record, the content of each securitized record generated by the computing platform for each requested record, and/or the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from a second computing platform, a request to retrieve records;
   generate, in response to receiving the request to retrieve records, a graphical user interface;
   send, to the second computing platform, the graphical user interface, wherein sending the graphical user interface to the second computing platform is configured to cause the second computing platform to output the graphical user interface for display to a display device of the second computing platform;
receive, from the second computing platform, record retrieval data comprising user data identifying a user associated with the record retrieval data and further comprising record data identifying one or more requested records;
validate, for a first requested record of the one or more requested records, the user;
decrypt the first requested record to generate a decrypted requested record;
parse the decrypted requested record to generate parsed record data;
compare the parsed record data with predetermined textual content;
determine, based on a result of the comparing, that the parsed record data comprises a subset of predetermined textual content;
compare, a first confidentiality level associated with a first predetermined textual content in the subset of predetermined textual content with an access level associated with the user and a second confidentiality level associated with a second predetermined textual content in the subset of the predetermined textual content with the access level associated with the user, wherein the first confidentiality level and the second confidentiality level are different;
mark, based on a result of comparing the first confidentiality level of the first predetermined textual content with the access level associated with the user, the first predetermined textual content of the subset of predetermined textual content for securitization; and
generate a securitized record by redacting, from the decrypted requested record, the first predetermined textual content marked for securitization.

2. The computing platform of claim 1, the memory storing computer-readable instructions that, when executed by the at least one processor, cause the computing platform to:
determine that validation of the user for a second requested record of the one or more requested records was unsuccessful.

3. The computing platform of claim 2, the memory storing computer-readable instructions that, when executed by the at least one processor, cause the computing platform to:
generate a second graphical user interface comprising a first section and a second section; and
send, to the second computing platform, the graphical user interface, wherein sending the graphical user interface to the second computing platform is configured to cause the second computing platform to output the second graphical user interface for display to the display device of the second computing platform.

4. The computing platform of claim 3, wherein the first section of the second graphical user interface is associated with the first requested record and comprises the securitized record.

5. The computing platform of claim 3, wherein the second section of the second graphical user interface is associated with the second requested record and comprises an indication that validation of the user for the second requested record was unsuccessful.

6. The computing platform of claim 1, wherein the record data identifying one or more requested records comprises a unique document identification number of each requested record of the one or more requested records.

7. The computing platform of claim 1, the memory storing computer-readable instructions that, when executed by the at least one processor, cause the computing platform to:
validate the user based on the user data in the record retrieval data.

8. The computing platform of claim 1, wherein the predetermined textual content may be dynamically modified.

9. The computing platform of claim 1, the memory storing computer-readable instructions that, when executed by the at least one processor, cause the computing platform to:
update a log with the securitized record.

10. A method comprising:
at a computing platform comprising at least one processor, a communication interface, and memory:
receiving, from a second computing platform, a request to retrieve records;
generating, in response to receiving the request to retrieve records, a graphical user interface;
sending, to the second computing platform, the graphical user interface, wherein sending the graphical user interface to the second computing platform is configured to cause the second computing platform to output the graphical user interface for display to a display device of the second computing platform;
receiving, from the second computing platform, record retrieval data comprising user data identifying a user associated with the record retrieval data and further comprising record data identifying one or more requested records;
validating, for a first requested record of the one or more requested records, the user;
decrypting the first requested record to generate a decrypted requested record;
parsing the decrypted requested record to generate parsed record data;
comparing the parsed record data with predetermined textual content;
determining, based on a result of the comparing, that the parsed record data comprises a subset of predetermined textual content;
comparing, a first confidentiality level associated with a first predetermined textual content in the subset of predetermined textual content, associated with the user and a second confidentiality level associated with a second predetermined textual content in the subset of the predetermined textual content with the access level associated with the user, wherein the first confidentiality level and the second confidentiality level are different;
marking, based on a result of comparing the first confidentiality level of the first predetermined textual content with the access level associated with the user, first predetermined textual content of the subset of predetermined textual content for securitization; and
generating a securitized record by redacting, from the decrypted requested record, the first predetermined textual content marked for securitization.

11. The method of claim 10, further comprising:
determining that validation of the user for a second requested record of the one or more requested records was unsuccessful.

12. The method of claim 11, further comprising:
generating a second graphical user interface comprising a first section and a second section; and sending, to the second computing platform, the graphical user interface, wherein sending the graphical user interface to the second computing platform is configured to cause the second computing platform to output the second graphical user interface for display to the display device of the second computing platform.

13. The method of claim 12, wherein the first section of the second graphical user interface is associated with the first requested record and comprises the securitized record.

14. The method of claim 12, wherein the second section of the second graphical user interface is associated with the second requested record and comprises an indication that validation of the user for the second requested record was unsuccessful.

15. The method of claim 10, wherein the record data identifying the one or more requested records comprises a unique document identification number of each requested record of the one or more requested records.

16. The method of claim 10, further comprising:
validating the user based on the user data in the record retrieval data.

17. The method of claim 10 wherein the predetermined textual content may be dynamically modified.

18. The method of claim 10, further comprising:
updating a log with the securitized record.

19. One or more non-transitory computer-readable media storing instructions that, when executed by a computing platform comprising at least one processor, a communication interface, and memory, cause the computing platform to:
receive, from a second computing platform, a request to retrieve records;
generate, in response to receiving the request to retrieve records, a graphical user interface;
send, to the second computing platform, the graphical user interface, wherein sending the graphical user interface to the second computing platform is configured to cause the second computing platform to output the graphical user interface for display to a display device of the second computing platform;
receive, from the second computing platform, record retrieval data comprising user data identifying a user associated with the record retrieval data and further comprising record data identifying one or more requested records;
validate, for a first requested record of the one or more requested records, the user;
decrypt the first requested record to generate a decrypted requested record;
parse the decrypted requested record to generate parsed record data;
compare the parsed record data with predetermined textual content;
determine, based on a result of the comparing, that the parsed record data comprises a subset of predetermined textual content;
compare, a first confidentiality level associated with a first predetermined textual content in the subset of predetermined textual content, with an access level associated with the user and a second confidentiality level associated with a second predetermined textual content in the subset of the predetermined textual content with the access level associated with the user, wherein the first confidentiality level and the second confidentiality level are different;
mark, based on a result of comparing the confidentiality level of the first predetermined textual content with the access level associated with the user, the first predetermined textual content of the subset of predetermined textual content for securitization; and
generate a securitized record by redacting, from the decrypted requested record, the first one or more predetermined textual content marked for securitization.

20. The one or more non-transitory computer-readable media of claim 19, storing instructions that, when executed by the computing platform, cause the computing platform to:
determine that validation of the user for a second requested record of the one or more requested records was unsuccessful;
generate a second graphical user interface comprising a first section and a second section; and
send, to the second computing platform, the graphical user interface,
wherein sending the graphical user interface to the second computing platform is configured to cause the second computing platform to output the second graphical user interface for display to the display device of the second computing platform,
wherein the first section of the second graphical user interface is associated with the first requested record and comprises the securitized record, and
wherein the second section of the second graphical user interface is associated with the second requested record and comprises an indication that validation of the user for the second requested record was unsuccessful.

* * * * *